US012682561B2

(12) United States Patent
Couche et al.

(10) Patent No.: US 12,682,561 B2
(45) Date of Patent: Jul. 14, 2026

(54) DEVICES AND METHODS FOR GENERATING VIRTUAL OBJECTS

(71) Applicant: Apple Inc., Cupertino, CA (US)

(72) Inventors: Guillaume Couche, London (GB);
Jonny Yeo, London (GB)

(73) Assignee: Apple Inc., Cupertino, CA (US)

( * ) Notice: Subject to any disclaimer, the term of this patent is extended or adjusted under 35 U.S.C. 154(b) by 140 days.

(21) Appl. No.: 18/472,008

(22) Filed: Sep. 21, 2023

(65) Prior Publication Data

US 2024/0104841 A1      Mar. 28, 2024

Related U.S. Application Data

(60) Provisional application No. 63/377,032, filed on Sep. 24, 2022.

(51) Int. Cl.
| | |
|---|---|
| *G06T 17/00* | (2006.01) |
| *G06F 3/04815* | (2022.01) |
| *G06F 3/0482* | (2013.01) |
| *G06F 3/04842* | (2022.01) |
| *G06T 19/00* | (2011.01) |

(52) U.S. Cl.
CPC .......... *G06T 17/00* (2013.01); *G06F 3/04815* (2013.01); *G06F 3/0482* (2013.01); *G06F 3/04842* (2013.01); *G06T 19/00* (2013.01); *G06T 2200/24* (2013.01)

(58) Field of Classification Search
CPC ..... G06T 17/00; G06T 19/00; G06T 2200/24; G06T 19/006; G06T 2219/2021; G06T 19/20; G06F 3/04815; G06F 3/0482; G06F 3/04842; G06F 3/011; G06F 3/04845
See application file for complete search history.

(56) References Cited

U.S. PATENT DOCUMENTS

| | | | |
|---|---|---|---|
| 10,453,259 B2 | 10/2019 | Abe et al. | |
| 11,120,639 B1 * | 9/2021 | Smith | ..................... G06F 3/011 |
| 11,615,579 B1 | 3/2023 | Thivierge | |
| 12,151,162 B2 | 11/2024 | Mahlmeister et al. | |
| 12,153,737 B2 | 11/2024 | Ramani et al. | |

(Continued)

OTHER PUBLICATIONS

"Scanning and Detecting 3D Objects", Apple Developer [online]. Apple Inc. 2024 [retrieved on Apr. 18, 2024]. Retrieved from the Internet: <URL: https://developer.apple.com/documentation/arkit/ arkit_in_ios/content_anchors/scanning_and_detecting_3d_ objects>.

(Continued)

*Primary Examiner* — Jitesh Patel

(74) *Attorney, Agent, or Firm* — Kubota & Basol LLP

(57)      ABSTRACT

Some examples described in this disclosure are directed to devices, methods, and graphical user interfaces for generating, updating, and/or presenting virtual objects in a computer-generated environment. In some examples, an electronic device presents a user interface for generating a virtual object corresponding to the real-world object detected by the electronic device, where the user interface includes selectable options corresponding to respective portions of the real-world object. In some examples, in response to receiving a selection of a first portion of the real-world object, the electronic device updates the user interface and corresponding selectable options according to the first portion of the real-world object.

20 Claims, 26 Drawing Sheets

(56) References Cited

U.S. PATENT DOCUMENTS

| | | | |
|---|---|---|---|
| 12,288,279 | B2 | 4/2025 | Brandt et al. |
| 12,301,930 | B2 | 5/2025 | Liu et al. |
| 12,315,090 | B1 | 5/2025 | Suresh et al. |
| 12,353,632 | B2 | 7/2025 | Hwang et al. |
| 2010/0185529 | A1 | 7/2010 | Chesnut et al. |
| 2013/0044128 | A1 | 2/2013 | Liu et al. |
| 2013/0335405 | A1 | 12/2013 | Scavezze et al. |
| 2015/0009130 | A1* | 1/2015 | Motta .................. G06F 3/0346 345/156 |
| 2016/0225164 | A1 | 8/2016 | Tomlin et al. |
| 2017/0270224 | A1* | 9/2017 | Singh ..................... G06F 30/00 |
| 2018/0173300 | A1 | 6/2018 | Schwarz et al. |
| 2021/0134066 | A1 | 5/2021 | Koidahl |
| 2022/0084279 | A1 | 3/2022 | Lindmeier et al. |
| 2023/0230333 | A1 | 7/2023 | Kawamae et al. |
| 2023/0386145 | A1* | 11/2023 | Faulkner ................. G06F 3/011 |
| 2024/0103683 | A1 | 3/2024 | Couche et al. |
| 2024/0211092 | A1 | 6/2024 | Loggins |
| 2024/0378801 | A1 | 11/2024 | Rivas Vetencourt |

OTHER PUBLICATIONS

Bobeshko, Anastasiia "Object Recognition in Augmented Reality", Medium [online]. Medium [retrieved on Apr. 18, 2024]. Retrieved from the Internet: <https://virtualrealitypop.com/object-recognition-in-augmented-reality-8f7f17127a7a>.

Non-Final Office Action received for U.S. Appl. No. 18/472,018, mailed on Jul. 17, 2025, 8 pages.

Notice of Allowance received for U.S. Appl. No. 18/472,018, mailed on Feb. 2, 2026, 8 pages.

* cited by examiner

301

300

302

304

306          308          310

401
418
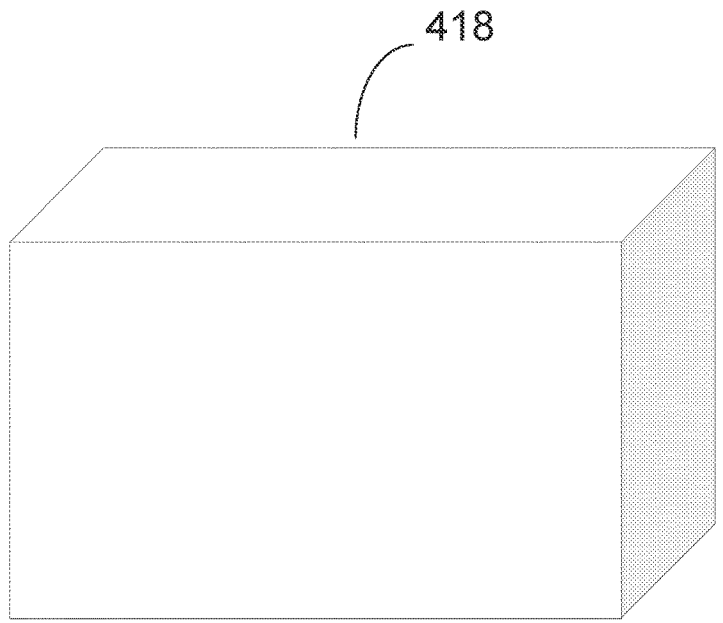
404
406
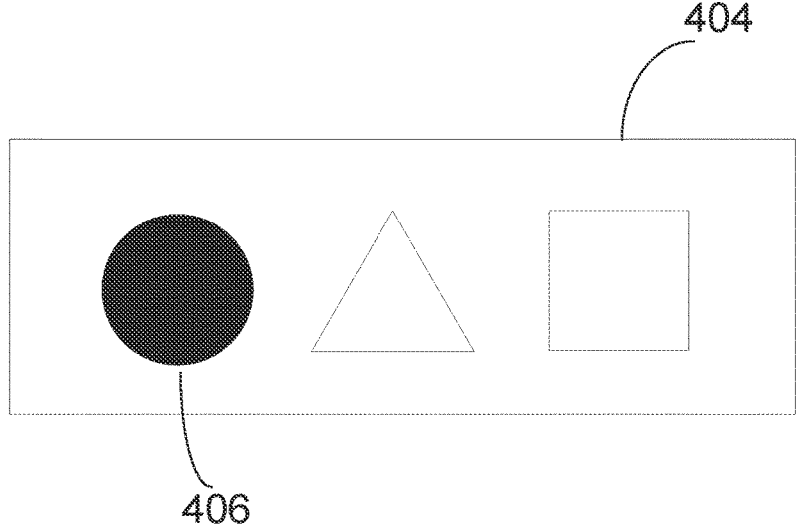
FIG. 4B

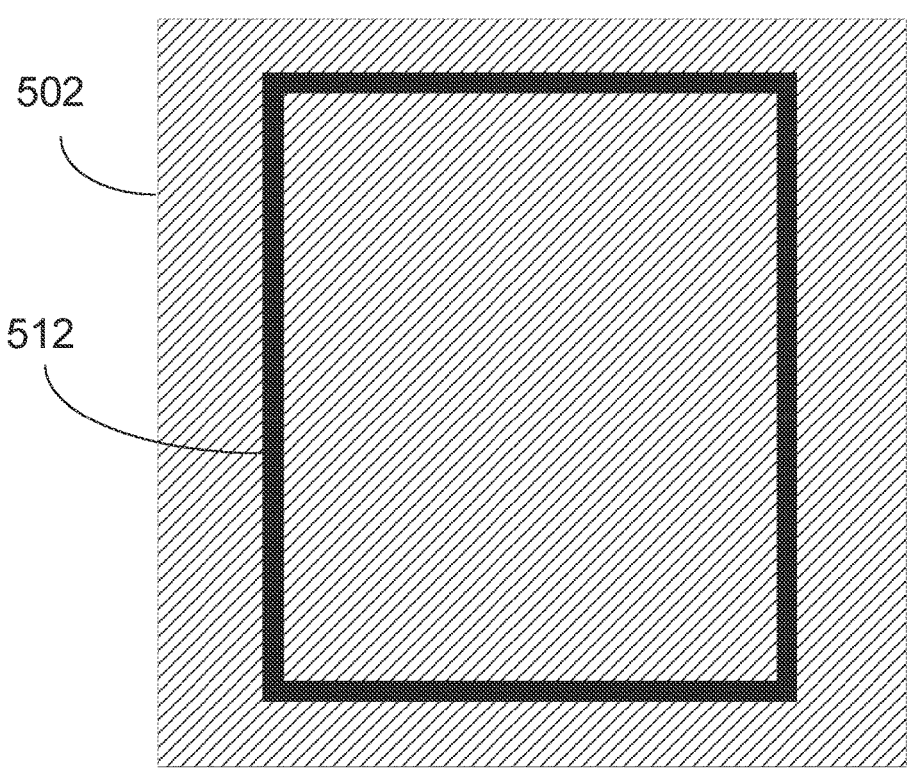
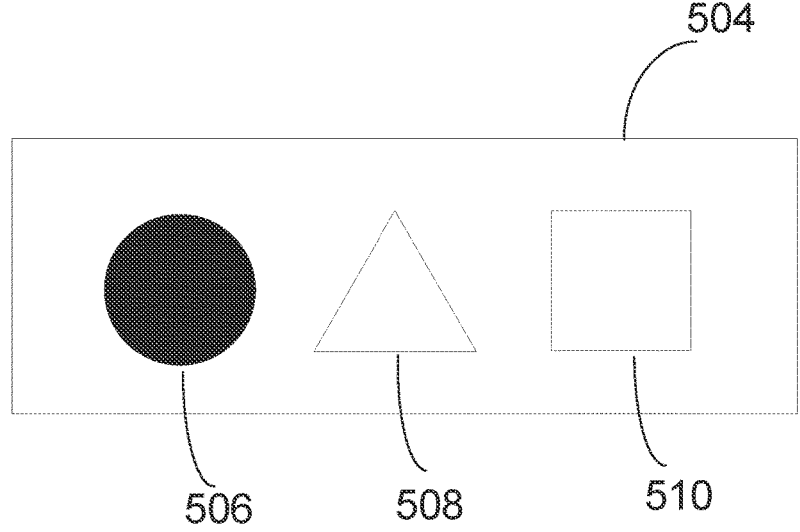
FIG. 5A

501

516

504

506

601
602
608
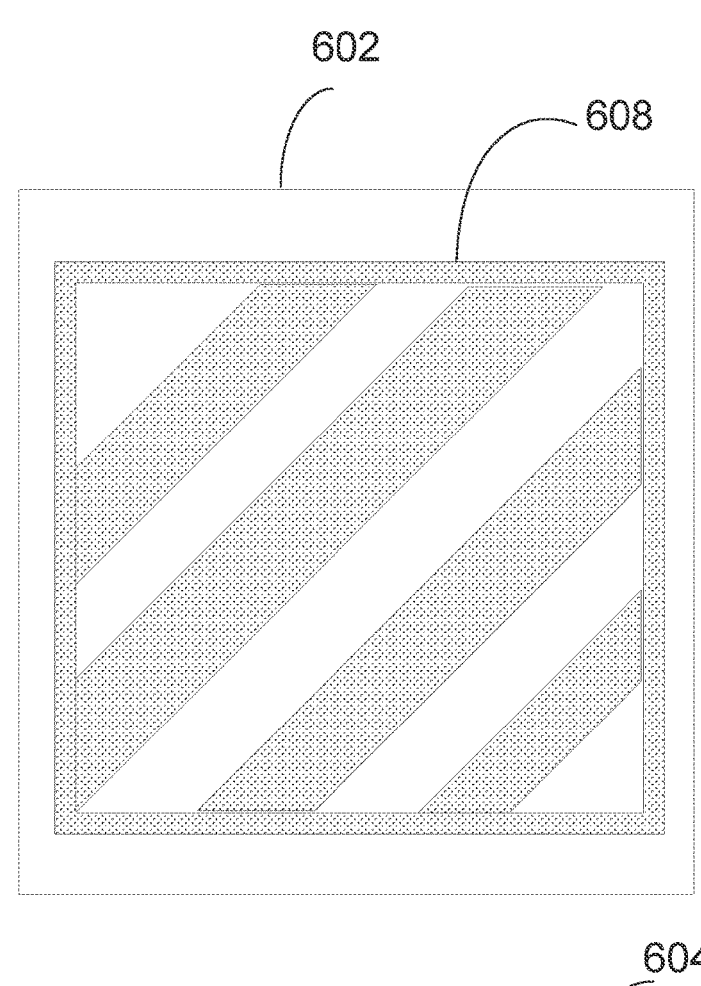
604
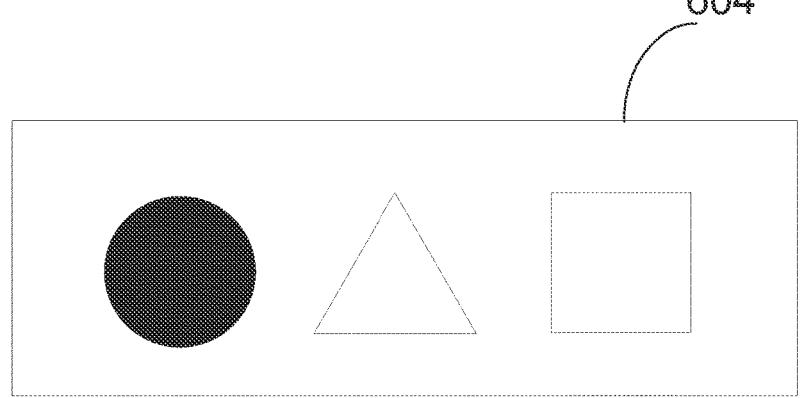
FIG. 6C

701
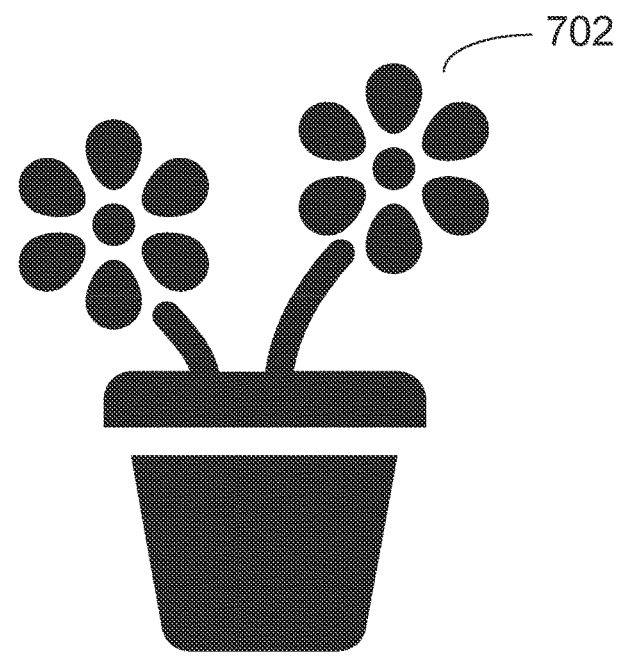
702
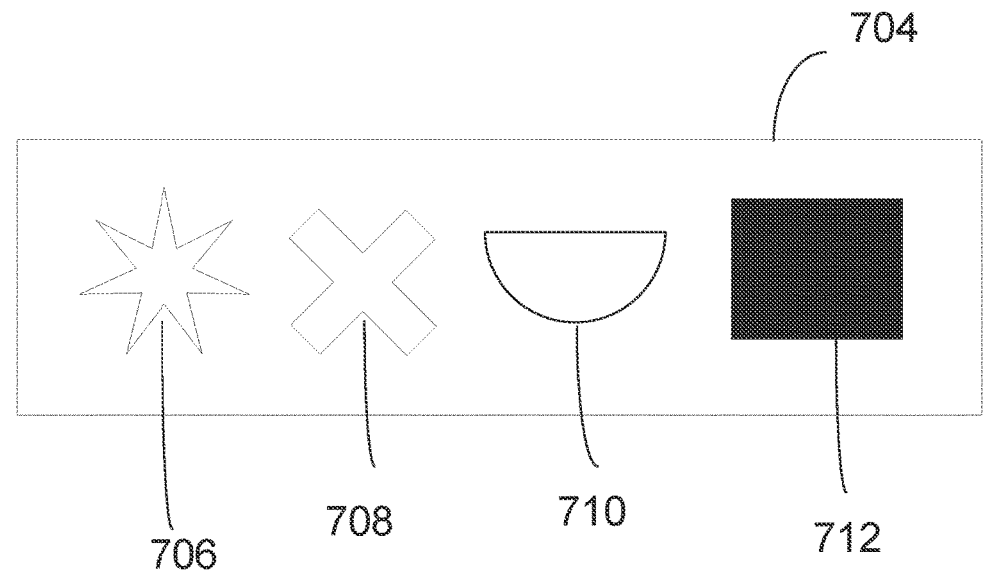
704
706    708    710    712
FIG. 7A

701
714
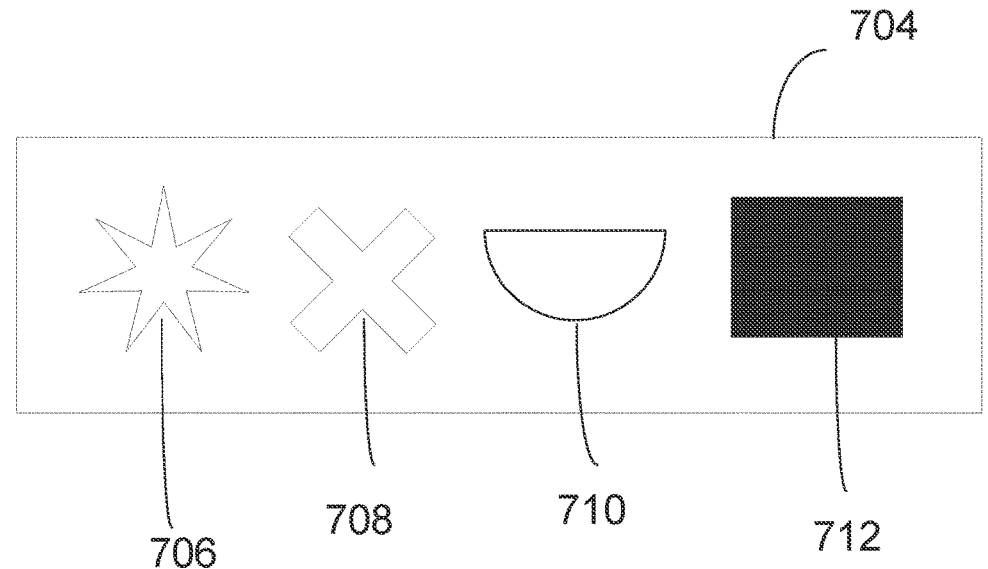
704
706     708     710     712
FIG. 7B

801
802
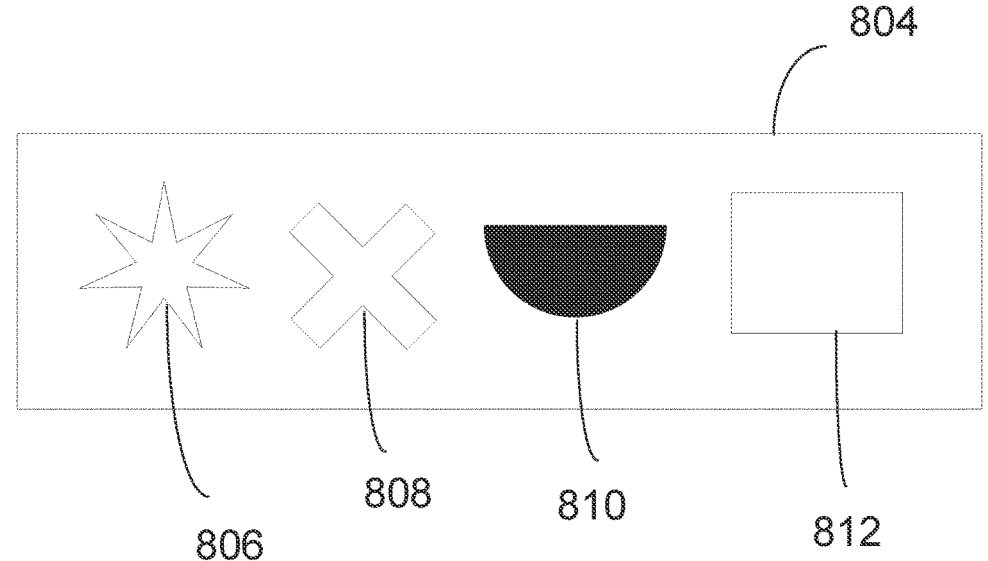
804
806 808 810 812
FIG. 8A

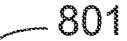
801
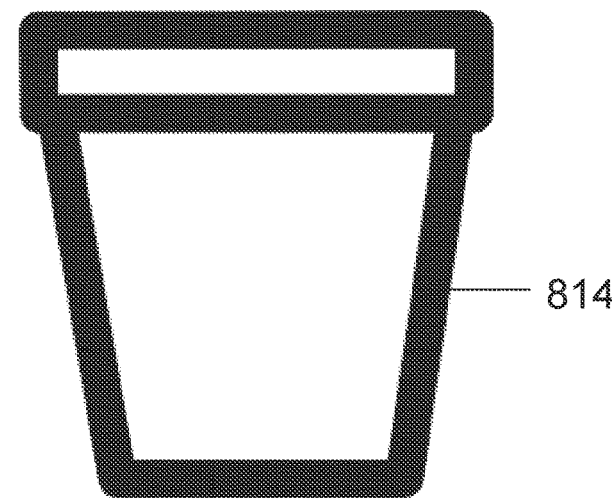
814
804
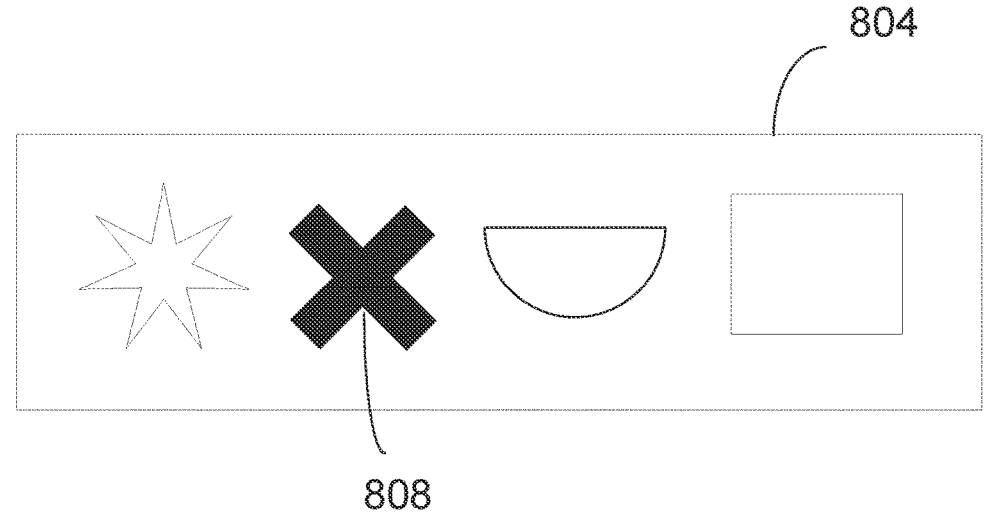
808
FIG. 8B

901

916

904

906     908     912

1000

Display a menu with options for sampling material of a real-world object, sampling structure of real-world object, and sampling object — 1002

Receive a selection from the options in the menu via user input — 1004

Generate a virtual object according to the option selected — 1006

1100

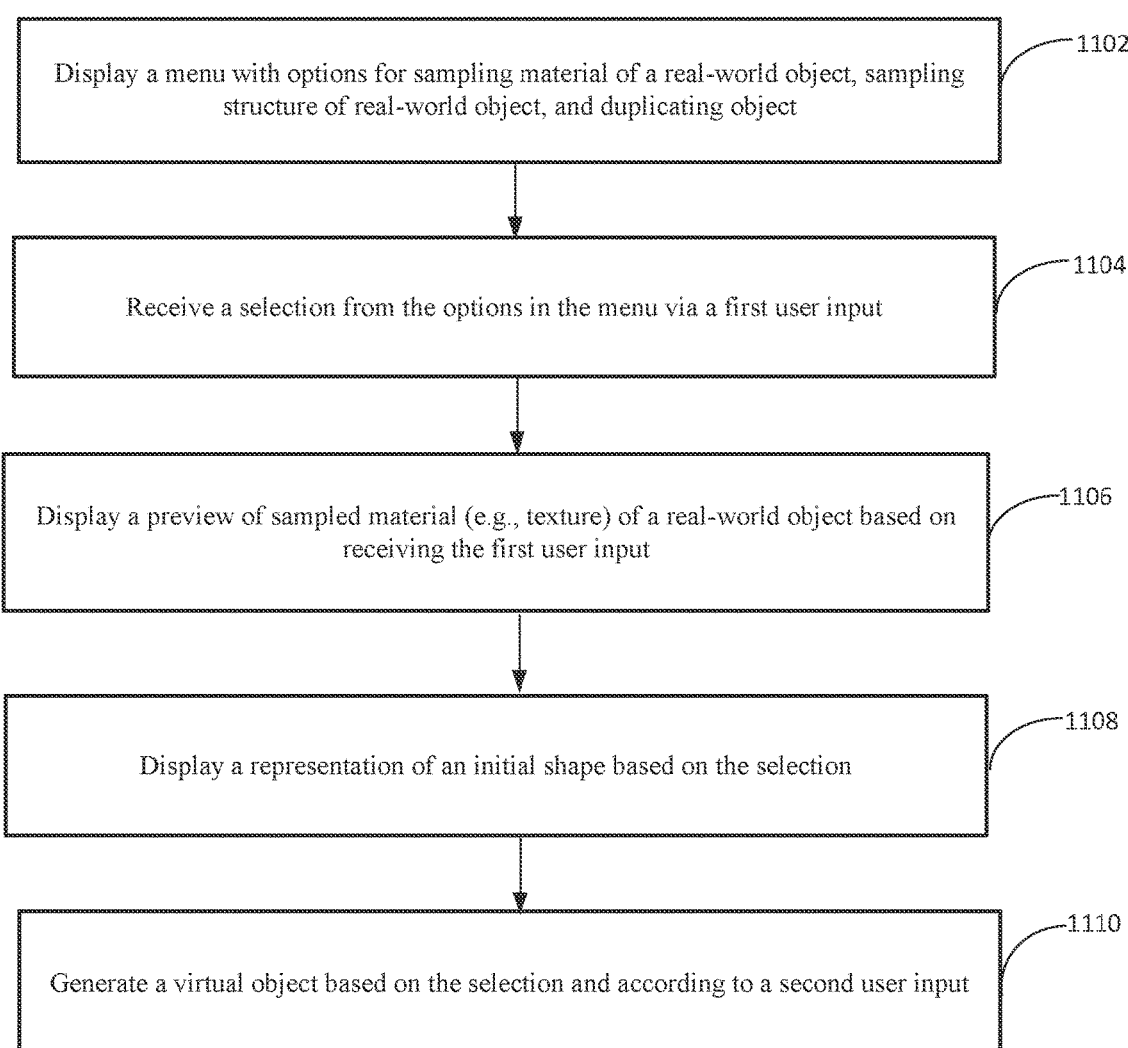

Display a menu with options for sampling material of a real-world object, sampling structure of real-world object, and duplicating object — 1102

Receive a selection from the options in the menu via a first user input — 1104

Display a preview of sampled material (e.g., texture) of a real-world object based on receiving the first user input — 1106

Display a representation of an initial shape based on the selection — 1108

Generate a virtual object based on the selection and according to a second user input — 1110

Display a menu with options for sampling material of a real-world object, sampling structure of real-world object, and duplicating object —1202

Receive a selection for duplicating object —1204

Generate a virtual object based on the selection —1206

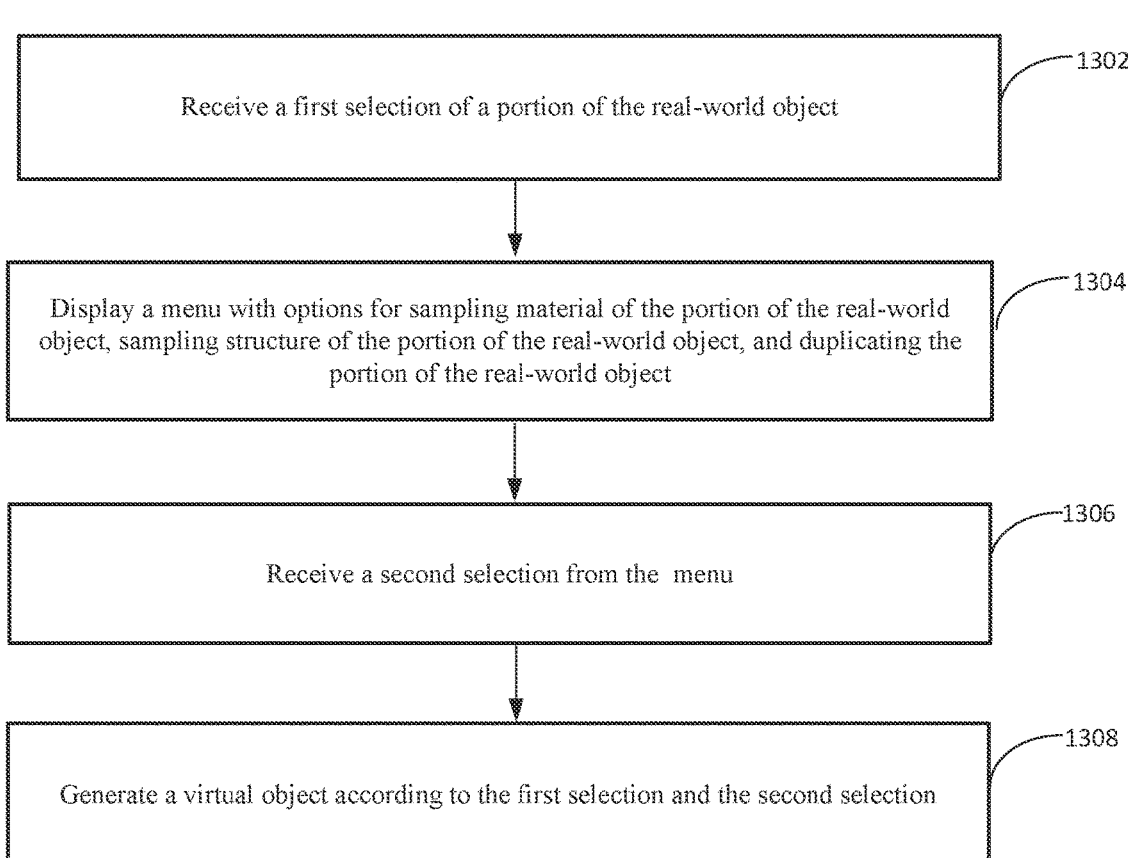

1300

Receive a first selection of a portion of the real-world object —1302

Display a menu with options for sampling material of the portion of the real-world object, sampling structure of the portion of the real-world object, and duplicating the portion of the real-world object —1304

Receive a second selection from the menu —1306

Generate a virtual object according to the first selection and the second selection —1308

FIG. 13

DEVICES AND METHODS FOR GENERATING VIRTUAL OBJECTS

CROSS-REFERENCE TO RELATED APPLICATIONS

This application claims the benefit of U.S. Provisional Application No. 63/377,032, filed Sep. 24, 2022, the content of which is herein incorporated by reference in its entirety for all purposes.

FIELD OF THE DISCLOSURE

This relates generally to computer systems that generate and/or present virtual objects and methods and graphical user interfaces for generating and/or presenting virtual objects.

BACKGROUND OF THE DISCLOSURE

Computer-generated environments are environments where at least some objects displayed for a user's viewing are generated using a computer. A user may interact with virtual objects displayed in a computer-generated environment using input devices (e.g., a mouse, a touch sensor, etc.). However, constructing three-dimensional virtual objects in such environments can be complex and time consuming.

SUMMARY OF THE DISCLOSURE

Some examples described in this disclosure are directed to devices, methods, and graphical user interfaces for generating, updating, and/or presenting three-dimensional virtual objects in a computer-generated environment. Creating virtual objects (e.g., three-dimensional virtual objects) from scratch can be complex and time consuming, especially for beginners. In some cases, a virtual object can be selected from a library of predefined virtual objects. In some cases, to modify a virtual object, materials (e.g., textures) and/or structures are chosen from a library and applied to the virtual object after the virtual object has been created. However, applying materials and/or structures to a virtual object after the virtual object has been created often results in the virtual object appearing less realistic in the computer-generated environment. Further, navigating libraries for creating virtual options can be cumbersome, and often libraries provide limited options for generating and/or updating virtual objects. Therefore, in some examples, a virtual object can be generated based on detection of a real-world object (e.g., using sampling of the real-world object). Although primarily described in the context of real-world objects, it is understood that virtual objects can also be sampled and/or used to generate further virtual objects.

In some examples, an electronic device can present, via a display, a user interface (e.g., menu) with user interface elements for generating a virtual object corresponding to the real-world object detected by the electronic device. In some examples, the user interface elements include options for sampling the real-world object, and the sampling can be used for content creation. In some examples, input from an electronic device (e.g., smartphone) or handheld device (e.g., stylus or a wand) can be used to sample material and/or structure of a real-world object for content creation. In some examples, virtual content (e.g., virtual objects) created based on sampling a real-world object can be saved in a library for future use and/or modification. In some examples, machine learning techniques and/or artificial intelligence three-dimensional modeling can be applied to sampling a real-world object and creating virtual content based on the sampling of the real-world object. In some examples, the user interface elements correspond to different portions of the real-world object. For example, if the real-world object includes a pot with orchids, the user interface can include user interface elements corresponding to various portions of the pot with orchids (e.g., a user interface element corresponding to a pot, a user interface element corresponding to a stem, a user interface element corresponding to flower petals). In some examples, the user interface can include a user interface element for duplicating the real-world object (e.g., the pot with orchids).

As described herein, in some examples, duplicating the real-world object includes creating a virtual object that is a replica (e.g., exact copy) of real-world object. In some examples, duplicating the real-world object includes creating a virtual object similar to the real-world object, such that the virtual object includes at least one characteristic different from the real-world object. For example, virtual sunflowers can be created based on the real-world orchids. As mentioned above, creating virtual objects can be complex and time consuming. As such, duplicating a real-world object (e.g., creating a virtual object similar to a real-world object) can be useful to a user desiring to create a variety of virtual objects (e.g., a virtual garden with different flowers) based on the real-world object. Further, the virtual object that is similar to the real-world object can serve as a base design when modifying the virtual object and/or creating additional virtual objects.

In some examples, a virtual object can be created based on a selection of the user interface elements corresponding to respective portions of the real-world object. In some examples, selecting a user element corresponding to the pot generates a virtual pot that is an exact copy of real-world pot or a virtual pot that is similar to the pot. In some examples, selecting a user element corresponding to the pot provides for generating a virtual pot that has the material and/or structure of the real-world pot.

In some examples, the user interface elements within the user interface (e.g., menu) are updated based on the selection of a portion (e.g., pot) of the real-world object (e.g., pot including orchids). In some examples, the updated user interface elements include a user interface element for creating content corresponding to a structure of the portion of the real-world object (e.g., structure of the pot), a user interface element for creating content corresponding to a material of the portion of the real-world object (e.g., material of the pot), and a user interface element corresponding to creating content by duplicating the portion of the real-world object (e.g., the pot). It can be appreciated that updating a user interface based on detection of a real-world object and user selections improves user experience when creating virtual objects.

It is understood that this Summary does not limit the scope of the disclosure in any way. Additional examples of this disclosure are provided in the Drawings and the Detailed Description that follow.

BRIEF DESCRIPTION OF THE DRAWINGS

FIGS. 4A-4B illustrate exemplary ways for generating a virtual object having a material of a real-world object based on a sampling area of the real-world object in accordance with some examples of the disclosure.

FIGS. 5A-5C illustrate exemplary ways for generating a virtual object having a material of a real-world object in accordance with some examples of the disclosure.

FIGS. 6A-6C illustrate respective sampling areas corresponding to respective resolutions of potential virtual objects in accordance with some examples of the disclosure.

FIGS. 7A-7B illustrate exemplary ways for generating a virtual object based on a real-world object in accordance with some examples of the disclosure.

FIGS. 8A-8D illustrate exemplary ways for generating a virtual object based on respective portions of a real-world object in accordance with some examples of the disclosure.

FIG. 11 illustrates another method for generating a virtual object having a material of a real-world object in accordance with some examples of the disclosure.

FIG. 13 illustrates another method for generating a virtual object having a structure of a portion of a real-world object in accordance with some examples of the disclosure.

DETAILED DESCRIPTION

Figure 1:
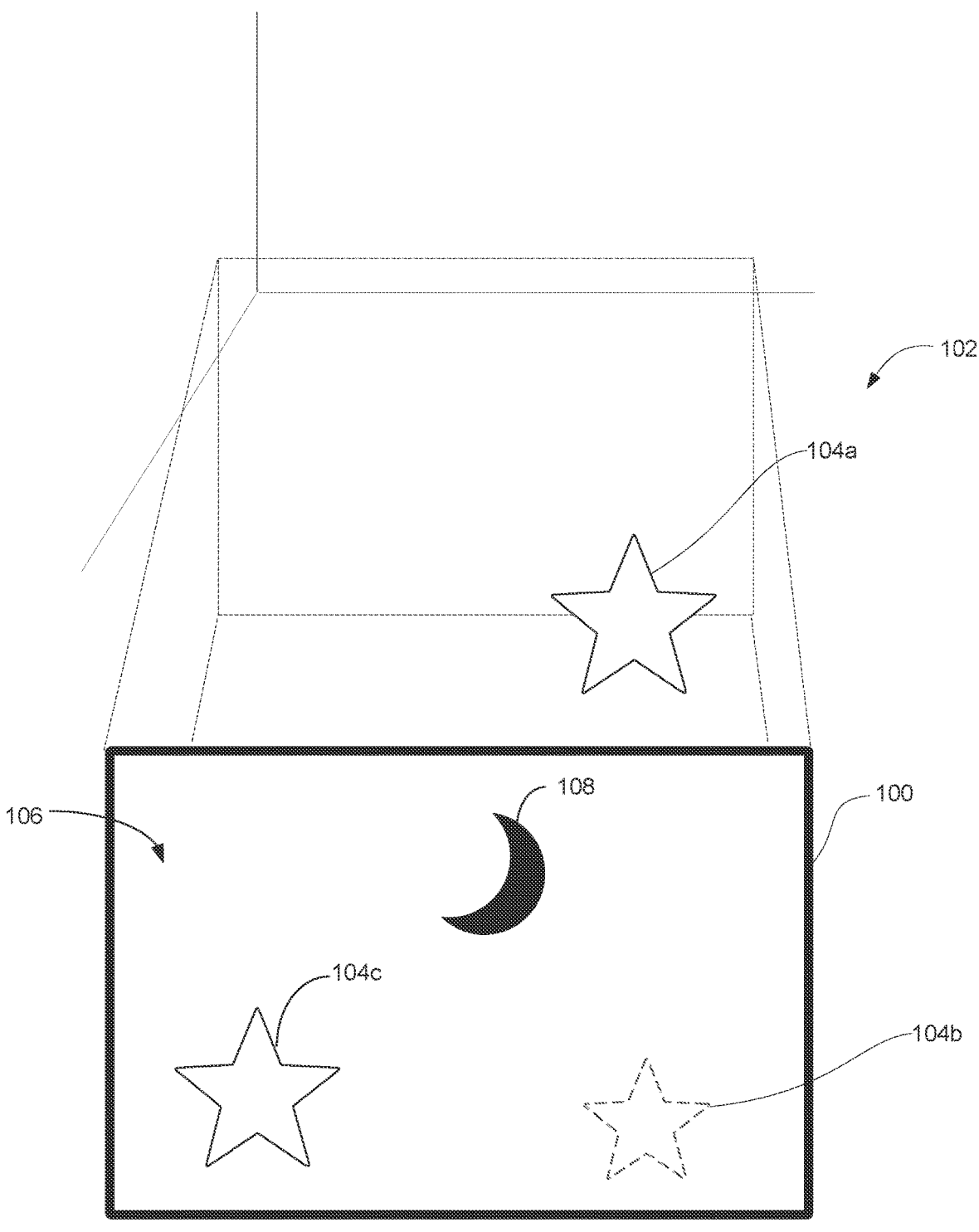
FIG. 1 illustrates an electronic device displaying a computer-generated environment according to some examples of the disclosure.

In the following description, reference is made to the accompanying drawings which form a part hereof, and in which it is shown by way of illustration specific examples that are optionally practiced. It is to be understood that other examples of the disclosure are optionally used, and structural changes are optionally made without departing from the scope of the disclosure.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Further, although the following description uses terms "first," "second," etc. to describe various elements, these elements should not be limited by the terms. These terms are only used to distinguish one element from another. For example, a first two-dimensional feature (or first two-dimensional element) could be termed a second two-dimensional feature (or second two-dimensional element), and, similarly, a second two-dimensional feature (or first two-dimensional element) could be termed a first two-dimensional feature (or first two-dimensional element), without departing from the scope of the various described examples. The first two-dimensional feature (or first two-dimensional element) and the second two-dimensional feature (or second two-dimensional element) are both two-dimensional features (or two-dimensional elements), but they are not the same two-dimensional feature (or two-dimensional element).

As described herein, the term "if", optionally, means "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A physical environment refers to a physical world that people can sense and/or interact with or without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. An XR environment is often referred to herein as a computer-generated environment. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 illustrates an electronic device 100 according to some examples of the disclosure. In some examples, the electronic device 100 is a portable electronic device, such as a tablet computer, laptop computer, a smartphone, or another device including a display generation component. Example architectures of electronic device 100 are described below with reference to the block diagrams of FIGS. 2A-2B. As shown in FIG. 1, the electronic device 100 is presenting a three-dimensional environment (e.g., a computer-generated environment) 106 that includes three-dimensional virtual objects 104c and 108. In some examples, the electronic device 100 presents the three-dimensional environment 106 (e.g., including the virtual objects 104c and 108) in response to one or more inputs.

In some examples, the electronic device 100 displays the virtual objects 104c and 108 without presenting, in the three-dimensional environment, portions of a physical environment 102 where the electronic device is physically located (e.g., some or all the content in the three-dimensional environment is virtual content). As illustrated, the electronic device displays the virtual object 108 (e.g., a virtual moon) without displaying a representation of a real-world object (e.g., representation of a real-world moon) corresponding to the virtual object 108. In some examples, the electronic device 100 presents the physical environment 102 and/or captures one or more images of the physical environment 102 around the electronic device 100 and displays the representations of the physical environment 102, such as a representation of real-world object 104a, in the three-dimensional environment. For example, the electronic device 100 displays, in the three-dimensional environment, a representation 104b together with the virtual content (e.g., virtual objects 104c and 108).

As illustrated, the electronic device 100 presents the representation 104b of the real-world object 104a (e.g., a representation of a real-world star) as well as the virtual object 104c (e.g., a virtual star) based on the real-world object 104a. As described herein virtual objects 104c and 108 can be generated using the content creation techniques described herein. For example, virtual object 104c and/or virtual object 108 can be generated using a duplication option from a content creation user interface. In some examples, virtual object 104c and/or virtual object 108 can be created by sampling materials or structures of other real-world objects as described herein.

In some examples, the three-dimensional environment optionally recreates portions of physical environment 102 such that the three-dimensional environment appears to the user of the electronic device 100 as if the user is physically located in physical environment 102 (e.g., optionally from the perspective of the user's current location in the physical environment and in direction that the user is currently facing). In some examples, while the electronic device 100 presents, in the three-dimensional environment, one or more other virtual objects (e.g., application user interface, operating system elements, representation of users of other electronic devices, representation of content items, etc.). In some examples, the other virtual objects include user interfaces for content creation (e.g., content creation menus) as described in more detail herein.

Figure 2A:
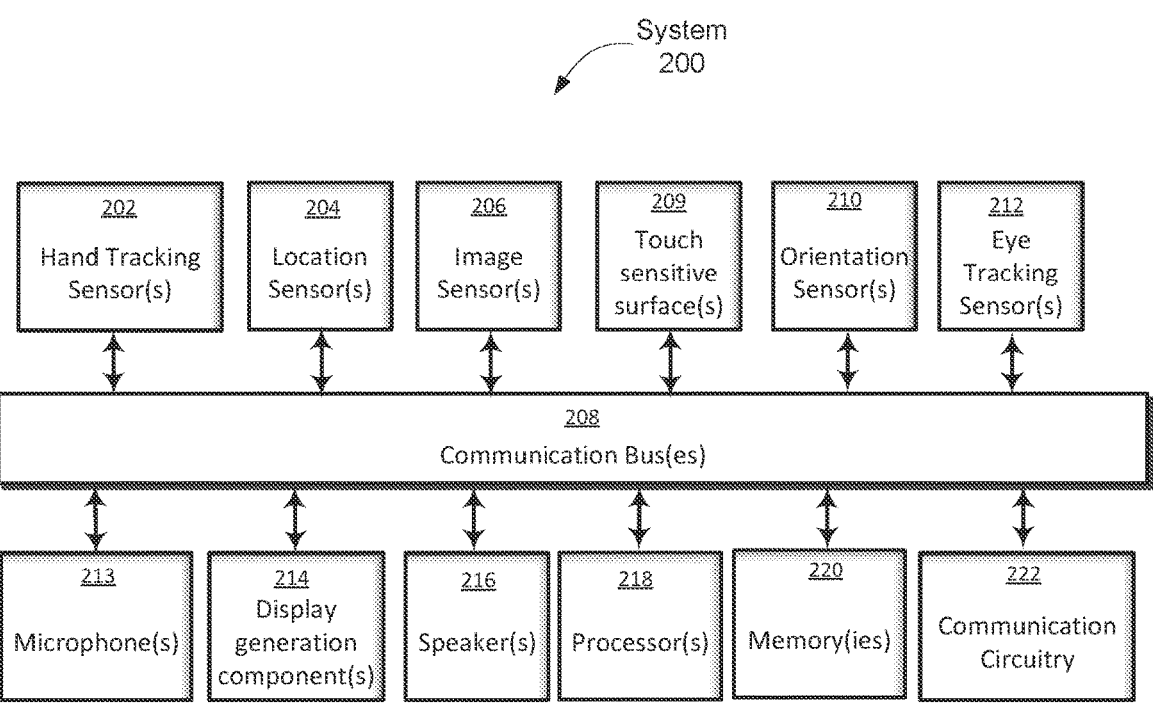
FIGS. 2A-2B illustrate example block diagrams of architectures for a system or device in accordance with some examples of the disclosure.
Figure 2B:
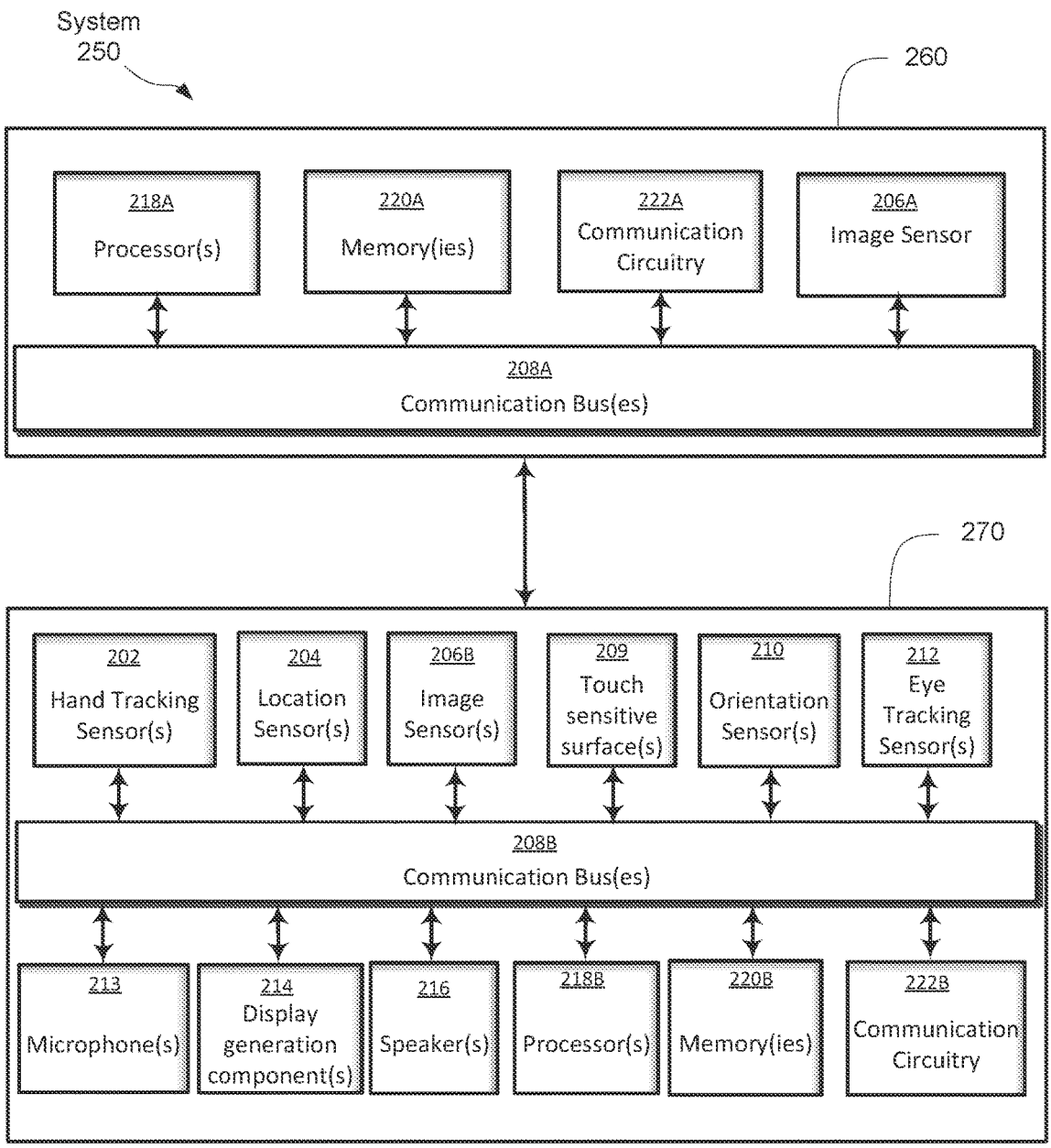

FIGS. 2A-2B illustrate example block diagrams of architectures for a system or device in accordance with some examples of the disclosure. In some examples, device 200 is a portable device, such as a mobile phone, smart phone, a tablet computer, a laptop computer, an auxiliary device in communication with another device, etc. As illustrated in FIG. 2A, device 200 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218, one or more memories 220, and/or communication circuitry 222. One or more communication buses 208 are optionally used for communication between the above-mentioned components of device 200.

Communication circuitry 222 optionally includes circuitry for communicating with electronic devices, networks, such as the Internet, intranets, a wired network and/or a wireless network, cellular networks and wireless local area networks (LANs). Communication circuitry 222 optionally includes circuitry for communicating using near-field communication (NFC) and/or short-range communication, such as Bluetooth®.

Processor(s) 218 optionally include one or more general purpose processors, one or more graphics processors, and/or one or more digital signal processors (DSPs). In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memories 220 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display generation component(s) 214 optionally include a single display (e.g., a liquid-crystal display (LCD), organic light-emitting diode (OLED), or other types of display). In some examples, display generation component(s) 214 include multiple displays. In some examples, display generation component(s) 214 includes a display with a touch-sensitive surface (e.g., a touch screen), a projector, a holographic projector, a retinal projector, etc.

In some examples, device 200 includes touch-sensitive surface(s) 209 configured to receive user inputs (touch and/or proximity inputs), such as tap inputs and swipe inputs or other gestures. In some examples, display generation component(s) 214 and touch-sensitive surface(s) 209 together form touch-sensitive display(s) (e.g., a touch screen integrated with device 200 or external to device 200 that is in communication with device 200).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment. Image sensor(s) 206 optionally include one or more depth sensors configured to detect the distance of physical objects from device 200. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, device 200 uses CCD sensors, event cameras, and depth sensors in combination to detect the physical environment around device 200. In some examples, image sensor(s) 206 include a first image sensor and a second image sensor. The first image sensor and the second image sensor work together and are optionally configured to capture different information of physical objects in the real-world environment. In some examples, the first image sensor is a visible light image sensor, and the second image sensor is a depth sensor. In some examples, device 200 uses image sensor(s) 206 to detect the position and orientation of device 200 and/or display generation component(s) 214 in the real-world environment. For example, device 200 uses image sensor(s) 206 to track the position and orientation of display generation component(s) 214 relative to one or more fixed objects in the real-world environment.

In some examples, device 200 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display generation component(s) 214, and/or relative to another coordinate system. Eye tracking sensor(s) 212 are configured to track the position and movement of a user's gaze (eyes, face, and/or head, more generally) with respect to the real-world or computer-generated environment and/or relative to the display generation component(s) 214. In some examples, hand tracking sensor(s) 202 and/or eye tracking sensor(s) 212 are implemented together with the display generation component(s) 214 (e.g., in the same device). In some examples, the hand tracking sensor(s) 202 and/or eye tracking sensor(s) 212 are implemented separate from the display generation component(s) 214 (e.g., in a different device).

In some examples, the hand tracking sensor(s) 202 uses image sensor(s) 206 (e.g., one or more IR cameras, 3D cameras, depth cameras, etc.) that capture three-dimensional information from the real-world including one or more hands. In some examples, the hands can be resolved with sufficient resolution to distinguish fingers and their respective positions. In some examples, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some examples, eye tracking sensor(s) 212 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some examples, both eyes are tracked separately by respective eye tracking cameras and illumination sources, and a gaze can be determined from tracking both eyes. In some examples, one eye (e.g., a dominant eye) is tracked by a respective eye tracking camera/illumination source(s).

Device 200 optionally includes microphones(s) 213 or other audio sensors. Device 200 uses microphone(s) 213 to detect sound from the user and/or the real-world environment of the user. In some examples, microphone(s) 213 includes an array of microphones that optionally operate together (e.g., to identify ambient noise or to locate the source of sound in space of the real-world environment).

Device 200 optionally includes location sensor(s) 204 configured to detect a location of device 200 and/or of display generation component(s) 214. For example, location sensor(s) 204 optionally includes a GPS receiver that receives data from one or more satellites and allows device 200 to determine the device's absolute position in the physical world.

Device 200 optionally includes motion and/or orientation sensor(s) 210 configured to detect orientation and/or movement of device 200 and/or display generation component(s) 214. For example, device 200 uses orientation sensor(s) 210 to track changes in the position and/or orientation of device 200 and/or display generation component(s) 214 (e.g., with respect to physical objects in the real-world environment). Orientation sensor(s) 210 optionally include one or more gyroscopes, one or more accelerometers, and/or one or more inertial measurement units (IMUs).

It is understood that the architecture of FIG. 2A is an example architecture, but that system/device 200 is not limited to the components and configuration of FIG. 2A. For example, the device/system can include fewer, additional, or other components in the same or different configurations. In some examples, as illustrated in FIG. 2B, system/device 250 can be divided between multiple devices. For example, a first device 260 optionally includes processor(s) 218A, memory or memories 220A, one or more image sensor(s) 206 (e.g., RGB camera), and communication circuitry 222A, optionally communicating over communication bus(es) 208A. In some examples, the first device 260 includes an input device, such as a stylus or a wand. A second device 270 (e.g., corresponding to device 200) optionally includes various sensors (e.g., one or more hand tracking sensor(s) 202, one or more location sensor(s) 204, one or more image sensor(s) 206 (e.g., RGB camera), one or more touch-sensitive surface(s) 209, one or more motion and/or orientation sensor(s) 210, one or more eye tracking sensor(s) 212, one or more microphone(s) 213 or other audio sensors, etc.), one or more display generation component(s) 214, one or more speaker(s) 216, one or more processor(s) 218B, one or more memories 220B, and/or communication circuitry 222B. One or more communication buses 208B are optionally used for communication between the above-mentioned components of device 270. The details of the components for devices 260 and 270 are similar to the corresponding components discussed above with respect to device 200 and are not repeated here for brevity. First device 260 and second device 270 optionally communicate via a wired or wireless connection (e.g., via communication circuitry 222A-222B) between the two devices.

Figure 3A:
FIGS. 3A-3C illustrate exemplary ways for generating a virtual object having a material of a real-world object in accordance with some examples of the disclosure.
Figure 3B:
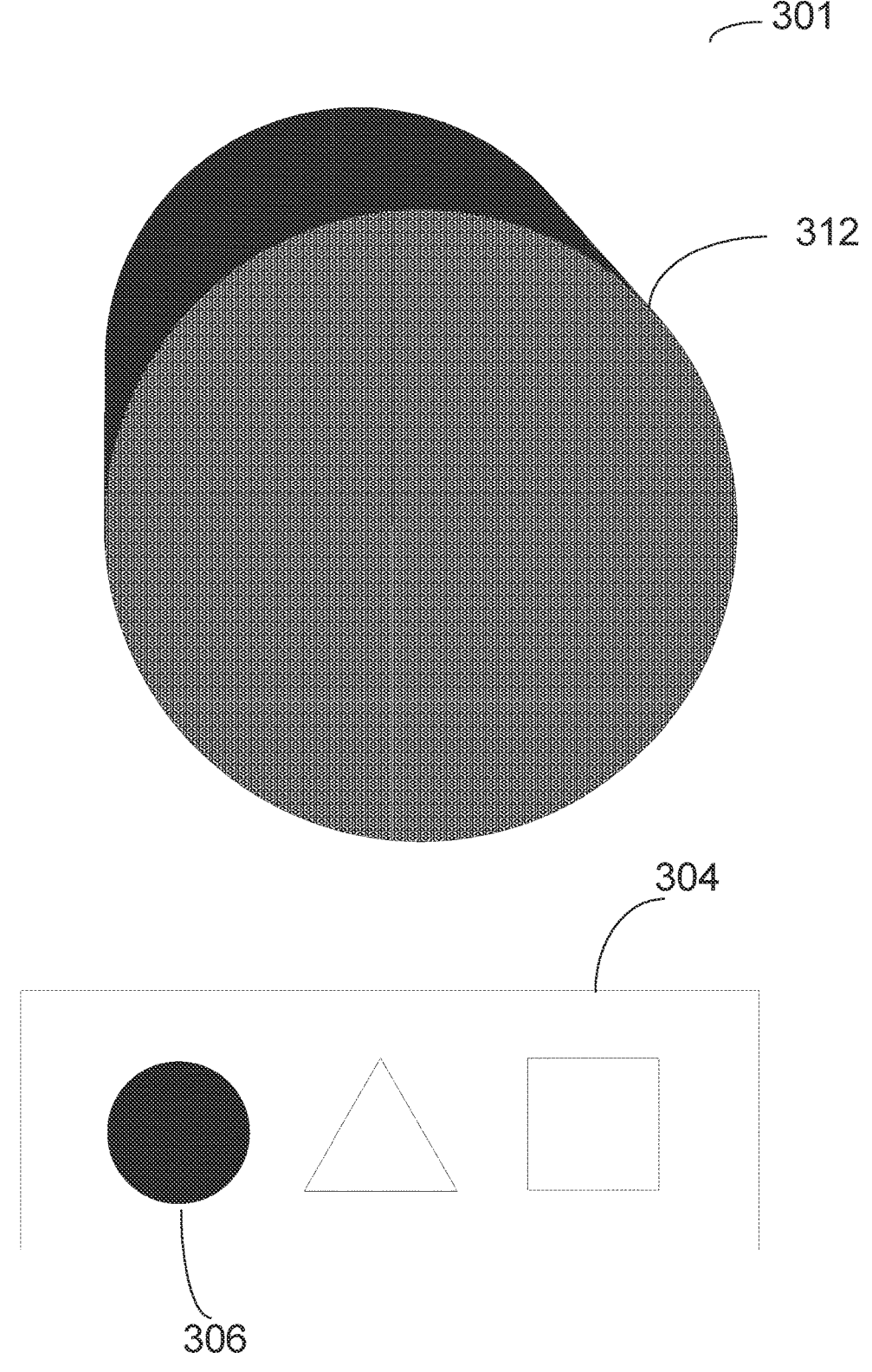
Figure 3C:
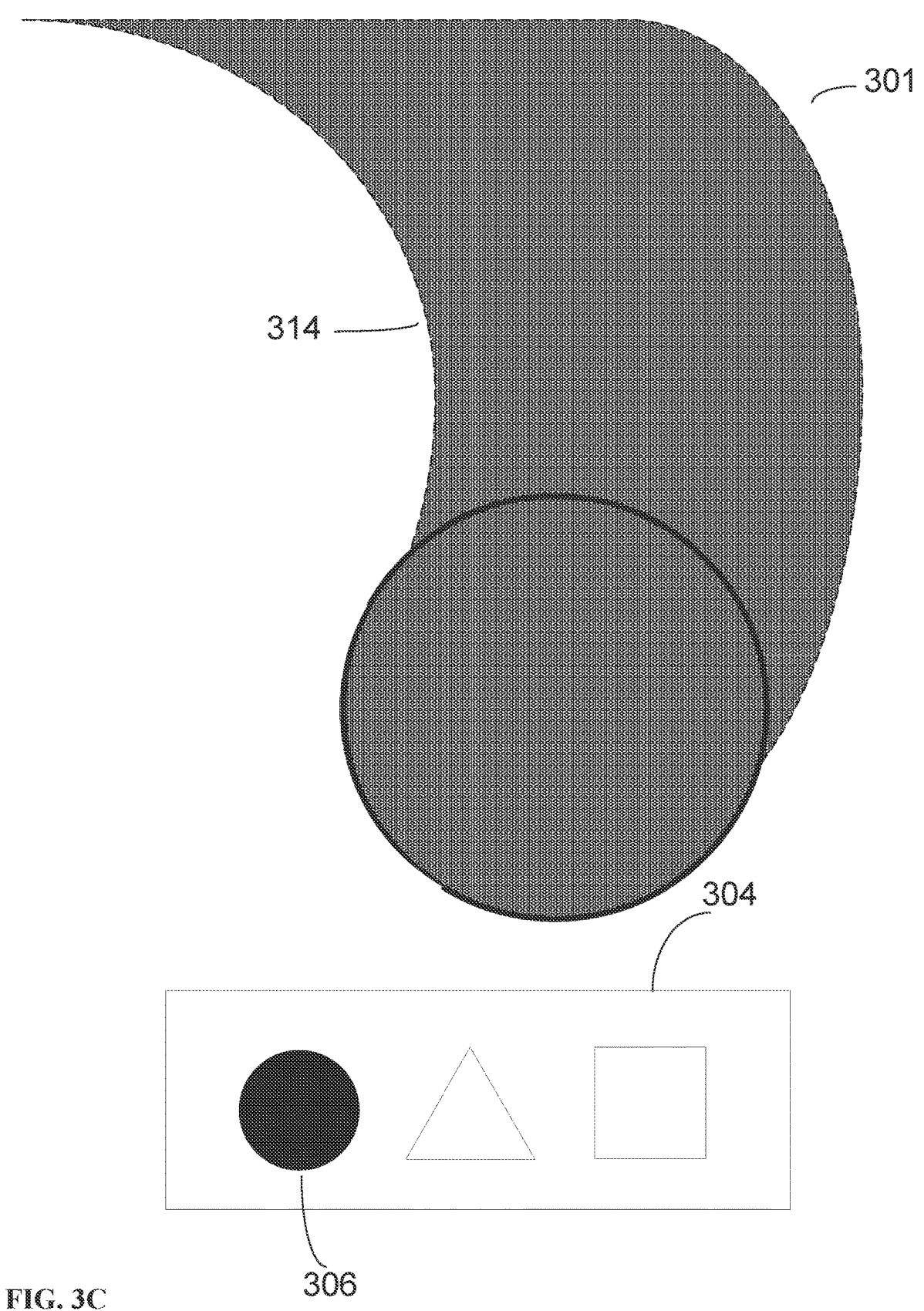

A computer-generated environment may be displayed using an electronic device (e.g., electronic device 100, device 200, device 250), including using one or more display generation components. The computer-generated environment can optionally include various graphics user interfaces ("GUIs") and/or user interface elements/objects. Attention is now directed towards examples of user interfaces ("UI") and associated processes that may be implemented on a computer system, such as a portable multifunction device or a head-mounted device with a display generation component, one or more input devices, and (optionally) one or more cameras. FIGS. 3A-3C illustrate exemplary ways for generating a virtual object having a material of a real-world object in accordance with some examples of the disclosure.

FIG. 3A illustrates a three-dimensional environment 301 (e.g., displayed via the display generation component 214) that includes a user interface 304 (e.g., a menu or user interface) for generating a virtual object (e.g., content creation) corresponding to a real-world object 300 detected by a device similar to device 200, first device 260, or second device 270, from a physical environment. In some examples, the device 200 detects selection of the real-world object 300 based on receiving user input. In some examples, the user input includes attention of the user directed towards the real-world object 300 for longer than a threshold amount of time (e.g., 100 ms, 500 ms, 1 s, 2 s, etc.). In some examples, the user input includes a gesture input provided by a portion (e.g., hand) of the user and directed to the real-world object 300 (e.g., direct or indirect contact). In some examples, the gesture input provided by the hand of the user includes a grabbing gesture in which a thumb and a number of fingers of the hand encircle the real-world object 300. In some examples, the user input includes attention of the user directed to the real-world object 300 when the grabbing is detected (e.g., at a distance from the physical object). The gesture input provided by the hand of the user optionally includes a pinching gesture in which a thumb and index finger of the hand move toward each other and touch. In some examples, the user input includes attention of the user directed to the real-world object 300 when the pinching gesture is detected. In some examples, gestures can be made in free-space based on movement of the hand in free-space or on a touch screen based on movement of the hand on the touch screen. In some examples, attention of a user is determined to be directed to a portion of the three-dimensional environment (e.g., real-world object 300 or a virtual object) based on detection of gaze directed to the portion of the three-dimensional environment (optionally, without requiring other conditions). In some examples, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some examples, the user input includes a gesture input provided by an input device, such as device 260 (e.g., stylus, wand), directed towards the real-world object 300. In some examples, the user input includes the input device being in direct contact with the real-world object 300. In some examples, the user input includes attention of the user directed to the real-world object 300 when the input device is in direct contact with the real-world object 300. In some examples, the user input includes the input device being a threshold distance (e.g., 100 mm, 1 cm, 1 m, 10 m, etc.) away from the real-world object but oriented (e.g., pointing) towards the real-world object 300. In some examples, the user input includes attention of the user directed to the real-world object 300 when the input device is pointed towards the real-world object while being a threshold distance (e.g., 100 mm, 1 cm, 1 m, 10 m, etc.) away from the real-world object 300. In some examples, the user input includes a pinching gesture provided by an input device (e.g., pinching on a button of the input device via a user's hand) while the input device is pointed towards the real-world object 300 or in direct contact with the real-world object 300. In some examples, the user input includes a pinching gesture provided by input device (e.g., pinching on a button of the input device via a user's hand) while attention of the user is directed towards the real-world object 300.

In some examples, in accordance with the user input (e.g., in response to receiving user input) corresponding to selection of the real-world object 300, the device 200 displays, via the display generation component 214, the user interface 304 (e.g., menu) for generating the virtual object corresponding to the real-world object. The user interface 304 includes any suitable number of selectable options (e.g., user interface elements), such as a first option (e.g., a first user interface element) 306, a second option (e.g., a second user interface element) 308, a third option (e.g., a third user interface element) 310, and so forth. It can be appreciated that the options in the menu are optionally contextualized or updated with respect to the selection of the real-world object as described below. In some examples, user interface 304 is invoked and displayed prior to the user input selecting the real-world object 300. Selection of the real-world object can include performing sampling of the real-world object, and/or selection of one of the selectable options can include choosing a type of sampling of the real-world object.

The first option (e.g., a first user interface element) 306 in the user interface 304 corresponds to creating content corresponding to a material of the real-world object 300. The second option (e.g., the second user interface element) 308 in the user interface 304 corresponds to creating content corresponding to a structure of the real-world object 300 as described in FIGS. 8A-8D and 9A-9B. The third option (e.g., the third user interface element) 310 in the user interface 304 corresponds to creating content by duplicating the real-world object 300 as described in FIGS. 7A-7B. In some examples, duplicating the real-world object 300 includes creating the virtual object to be an exact replica of the real-world object 300. That is, the virtual object shares the same characteristics as the real-world object 300. In some examples, duplicating the real-world object 300 includes creating the virtual object to be similar to the real-world object 300. That is, the virtual object includes one or more characteristics similar to the real-world object 300 and one or more characteristics different from the real-world object 300. As mentioned above, creating virtual objects (e.g., three-dimensional virtual objects) can be complex and time consuming, and navigating libraries of predefined virtual objects can be cumbersome. As such, creating a virtual object using a real-world object as a base design can improve the user experience when creating virtual objects. Rather than having to create a virtual object from scratch or selecting a virtual object from a library with limited number of predefined options, a user can easily draw on real-world objects for inspiration, but also create and customize virtual objects based on these real-world objects. The techniques described herein provide for generating a virtual object that represents a modified or similar version of a real-world object serving as a base design in response to selecting the third option 310 (e.g., corresponding to duplicating a real-world object such that the virtual object is similar to the real-world object).

As illustrated in FIG. 3A, a visual appearance of the first option 306 corresponding to creating content corresponding to a material of the real-world object 300 is emphasized (e.g., represented in FIG. 3A by black solid fill) in the user interface 304 based on receiving user input indicating selection of the first option 306 (e.g., attention of the user directed towards the first option 306, a portion such as a hand of the user pointing or in direct contact with the first option, and/or an input device pointing or in direct contact with the first option). In some examples, in response to receiving user input indicating selection of the first option 306, the device 200 can display a first visual representation 302 (e.g., preview) representing a sampled material. In some examples, when initially displayed before sampling a material, the first visual representation 302 is empty and appears to be transparent or translucent (e.g., but having some visible outline). In some examples, after sampling a real-world object (or if the object or portion of the object is selected before selecting first option 306), the first visual representation 302 appears to have the material and/or texture sampled from the real-world object. The first visual representation 302 can be optionally two-dimensional (e.g., a circle, or other two-dimensional shape) or three-dimensional (e.g., a sphere or other three-dimensional shape). In some examples, the first visual representation 302 is two-dimensional prior to sampling and changes to three-dimensional in response to sampling or other input. In some examples, in response to receiving the user input indicating selection of the first option 306 and/or receiving additional input sampling the real-world object, such as input indicative of a user targeting and selecting the real-world object 300 or a portion thereof (e.g., gazing at the real-world object and pinching with a hand, directly contacting the object with a hand or input device, pointing an input device at the real-world object 300 and tapping a button of the input device, etc.), the device 200 can display the first visual representation 302 (e.g., preview) having the material sampled from the real-world object 300. The first visual representation 302 (e.g., preview) can be any suitable size and/or shape.

In some examples, after displaying the first visual representation 302 having the material sampled from the real-world object 300 in FIG. 3A, the device 200 can display a second visual representation 312 (e.g., preview) having the material and/or texture of the real-world object 300 in the three-dimensional environment 301, as shown in FIG. 3B. The second visual representation 312 can be optionally two-dimensional (e.g., circle or other suitable shape) or three-dimensional (e.g., sphere or other suitable shape). In some examples, when the first visual representation 302 is two-dimensional, the second visual representation 312 is three-dimensional. The second visual representation 312 can be any suitable size and/or shape. For example, FIG. 3B illustrates a cylinder having the material and/or texture of the real-world object 300. In some examples, the dimensionality and/or the shape of the preview does not change (e.g., the preview is a sphere before and after sampling).

FIG. 3C illustrates a virtual object 314 having the material and/or texture of the real-world object 300. For example, after sampling the real-world object, additional input can be provided using a selection and or movement. For example, by pressing on a button on an input device while moving the input device (or holding a pinch gesture while moving a hand), a user can sketch (e.g., create), optionally in three-dimensional space, the virtual object 314 having the material and/or texture of the real-world object 300. For example, the content is created while the selection input is maintained in accordance with the movement of the first visual representation (e.g., which follows movement of the input device or hand). In some examples, the input device includes a touch and or force sensor, and touch and/or force inputs can change a characteristic of the content creation. For example, an input device can include a slider region, and after receiving input from a slider region of the input device, the device 200 can adjust the size and/or shape of the preview (e.g., increase or decrease the radius of a sphere, etc.), and thereby change the size of the content generated from the preview. Additionally or alternatively, the size and/or shape can be adjusted based on an amount of force applied to the input device. As illustrated, FIG. 3C depicts a curved shape having the material and/or texture of the real-world object 300, and following the dimensions and movement of the preview. In some examples, the size and/or shape of the preview can be adjusted in other ways, such as by another gesture by a second hand or from another user interface or user interface element in user interface 304.

Figure 4A:
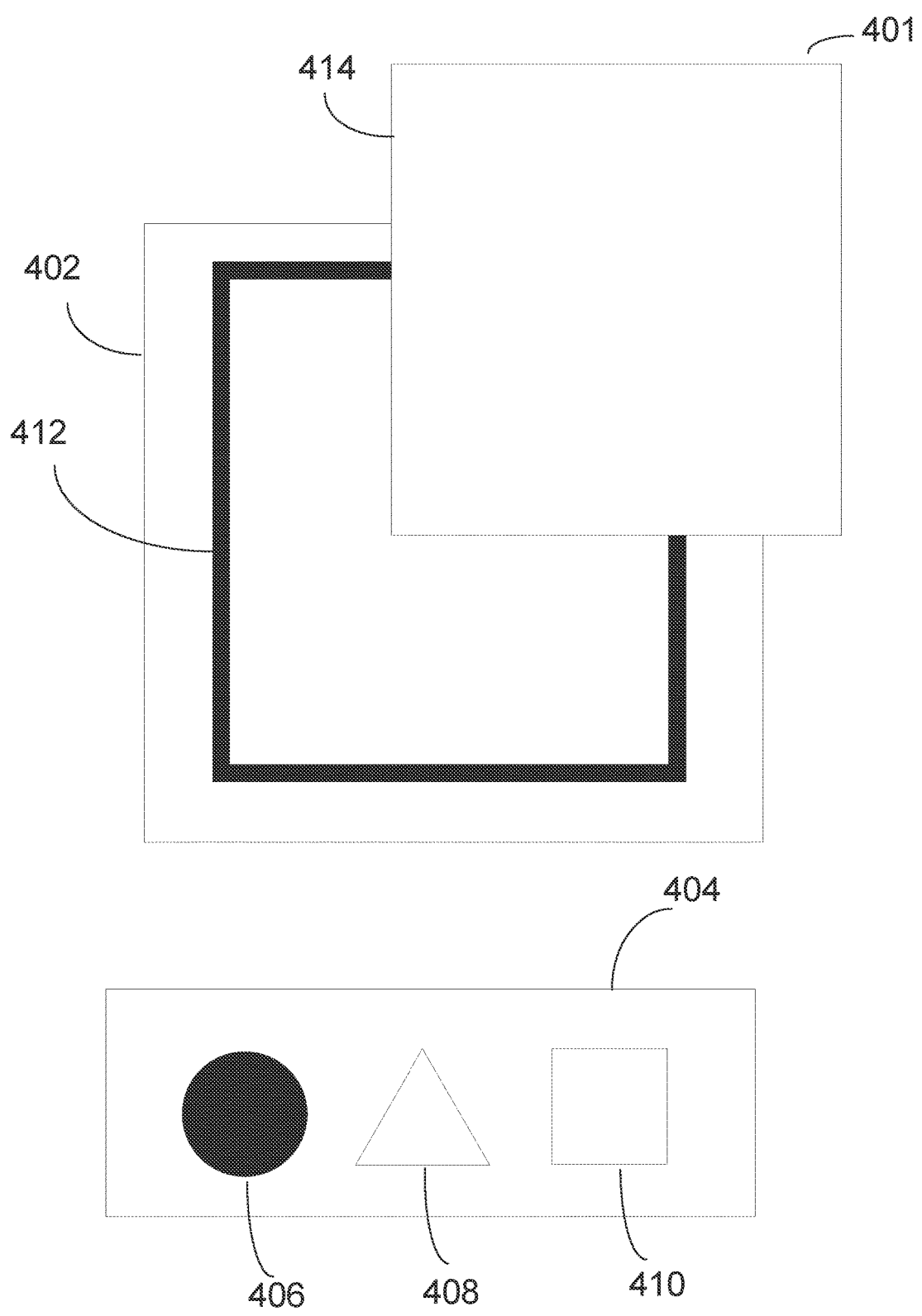

FIGS. 4A-4B illustrate exemplary ways for generating a virtual object having a material of a real-world object based on a sampling area of the real-world object in accordance with some examples of the disclosure. FIG. 4A illustrates a three-dimensional environment 401 including a real-world object 402 (e.g., a floor tile) having a first material and/or texture. FIG. 4A also includes user interface 404 presented to the user. As discussed above, user interface 404 is optionally presented in response to receiving a selection of the real-world object 402 or presented without first selecting the real-world object 402. User interface 404 (e.g., a menu) includes selectable options (e.g., user interface elements) 406, 408, and 410, which are optionally contextualized or updated according to the selection of the real-world object 402. Selectable options 406, 408, and 410 correspond to selectable options 306, 308, 310 as described in FIGS. 3A-3C. Further, in response to receiving user input indicating selection of a first option 406 for sampling a material, the device 200 can display a user interface element 412 representing a sampling region, such as a sampling area. In some examples, the selection of the real-world object (before or after the selection of option 406) can cause the sampling area to be disposed (e.g., superimposed) on the real-world object 402. In some examples, the device 200 can adjust the size, shape, position, and/or orientation of the user interface element 412 based on user input (e.g., provided by an input device or a portion (e.g., hand) of the user). For example, the device 200 can increase or decrease the size of the sample area based on input indicative of movement of the input device or the hand of the user while the input device or the hand of the user is directed (e.g., pointed) towards the user interface element 412 (e.g., dragging corners). In some examples, the user input (e.g., using an input device or hand gesture) can reposition and/or reorient user interface element 412 to a different portion or surface of the real-world object 402 (or another object). Based on the sample area, the device 200 can sample the real-world object and optionally create the first visual representation 414 (e.g., a preview) having the material of the real-world object 402. In some examples, the first visual representation 414 is the same in size and/or shape as the sample area. For example, FIG. 4A illustrates a square sample area and a square first visual representation 414 having the material and/or texture of the real-world object 402. In some examples, the first visual representation 414 is different in size and/or shape as the sample area. In some examples, the first visual representation 414 is displayed temporarily or the first visual representation 414 is subsequently repositioned (e.g., in three-dimensional space) and/or resized (e.g., miniaturized and moved out of the center of a field of view, such as to be near user interface 404). In some examples, sampling and the display of the first visual representation 414 having the material of the real-world object occurs in response to a user input indicating sampling. In some examples, the user input indicating sampling includes an input indicative of a user pointing the input device at the real-world object 402 with an input device and performing a gesture (e.g., tap, double tap, etc.) on an input surface (e.g., button, touch pad, force sensor, etc.) of the input device.

FIG. 4B illustrates generating a virtual object 418 having the material and/or texture of the real-world object 402 based on the sampling of FIG. 4A. For example, the material can be applied to an existing real-world or virtual object using a subsequent input. As illustrated, FIG. 4B depicts a rectangular prism having the material and/or texture of the real-world object 402. Additionally or alternatively, a user can sketch (e.g., create) a virtual object 418 having the material and/or texture sampled from the real-world object 402. For example, similar to the description of FIGS. 3A-3B, the sampled material can be represented as a first visual representation 414 that can be controlled by the user (e.g., using selection and movement input). For example, by holding a button on an input device while moving the input device, the user can create an object (e.g., in a similar manner as described with reference to FIG. 3C) using first virtual representation 414. In some examples, based on receiving input (e.g., from a slider region of the input device), the device 200 can adjust the size of the virtual object 418 or the first virtual representation 414 (e.g., increase or decrease the length, height, or width of the rectangular prism).

Figure 5B:
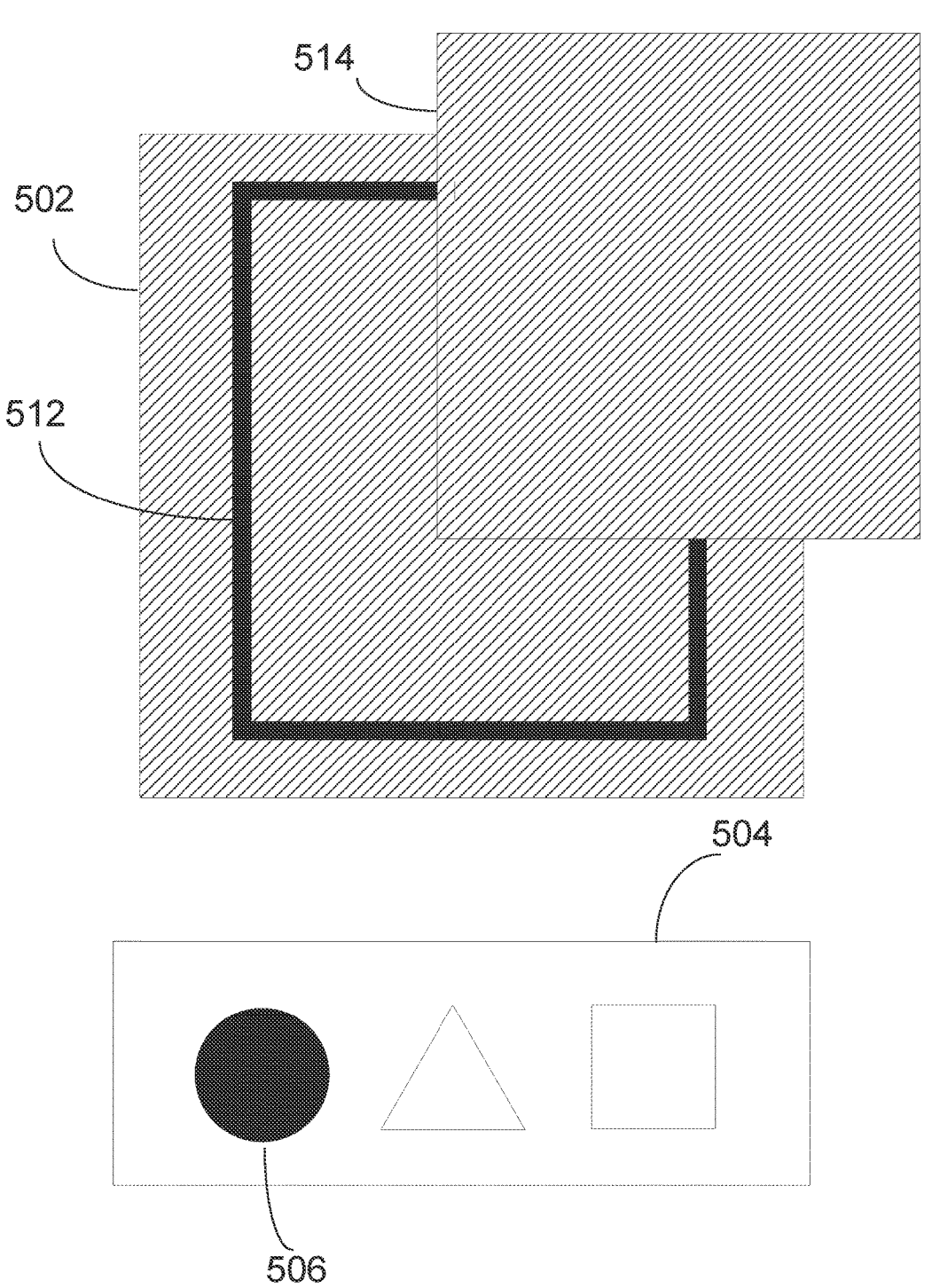
Figure 5C:
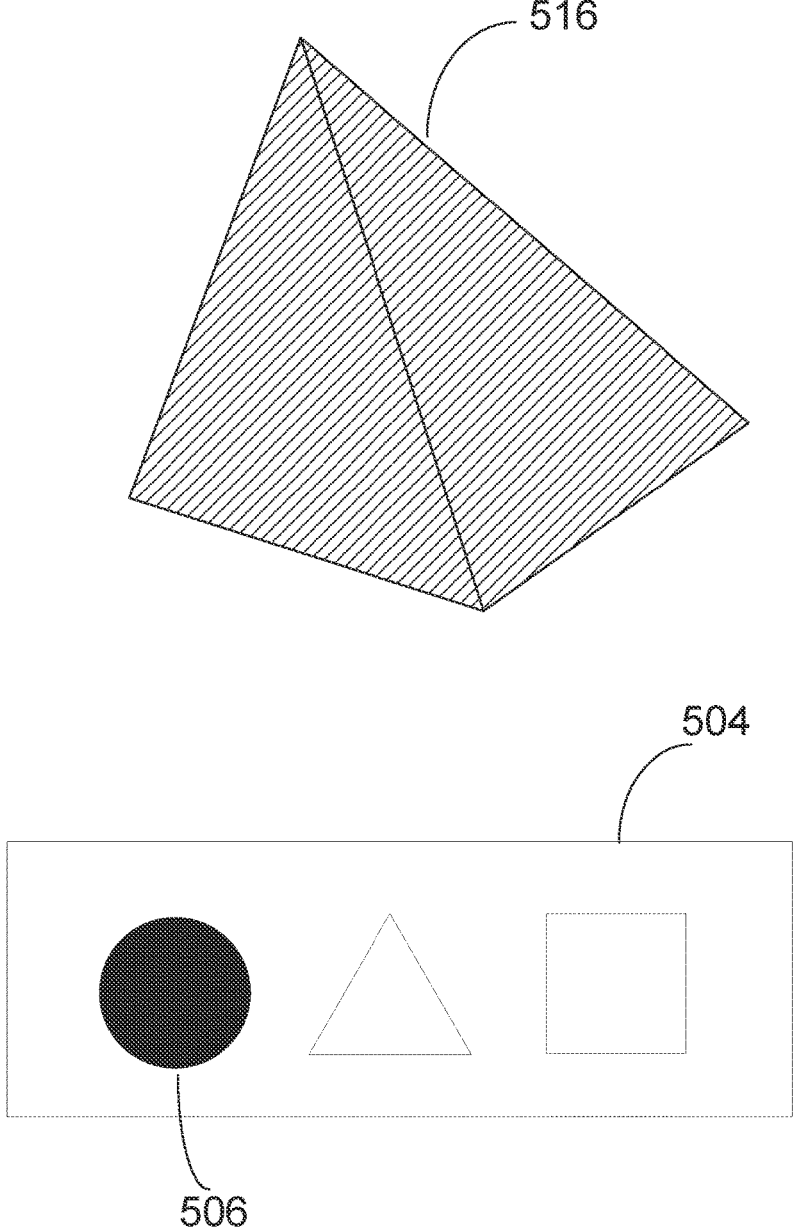

FIGS. 5A-5C illustrate exemplary ways for generating a virtual object having a material of a real-world object in accordance with some examples of the disclosure. FIG. 5A illustrates a three-dimensional environment 501 including a user interface 504 including selectable options 506, 508, and 510 corresponding to the user interface 404, the details of which are not repeated for brevity. FIG. 5A also illustrates a real-world object 502 (e.g., a textile swatch) that includes a different texture and/or material than the real-world object 402 of FIGS. 4A-4B. Similar to the discussion with respect to FIG. 4A, FIGS. 5A-5B illustrate a user interface element 512 representing a sampling region such as a sampling area (e.g., corresponding to user interface element 412).

As discussed above, in response to receiving user input indicating selection of a first option 506, the device 200 can display user interface element 512 (sample area) disposed (e.g., superimposed) on the real-world object 502. FIG. 5B illustrates the generation of a first visual representation 514 having the material and/or texture sampled from the real-world object 502 (e.g., in response to subsequent input), which is different than the material and/or texture of the real-world object 402.

FIG. 5C illustrates a virtual object 516 (e.g., shown as a triangular prism) having the sampled material and/or texture of the real-world object 502. The sampled material and/or texture can be applied to a real-world or virtual object (e.g., to or on a surface of the real-world or virtual object) or used to create a new virtual object. It is understood that some or all of the description of sampling and generating content with respect to FIGS. 4A-4B applies to the sampling and generation of content with respect of FIGS. 5A-5C. In some examples, the device 200 can use normal map approximation to create the first visual representation 514 and/or the virtual object 516 with a more realistic looking material based on the real-world object 502. Further, in some examples, the device 200 can apply double mirroring to create the first visual representation 514 and/or the virtual object 516 with tillable textures without post-processing. In some examples, the device 200 can create the first visual representation 514 (or first visual representation 414) using the LiDAR inferred mesh of the three-dimensional environment 501. Further, the real-world object 502 can be sampled for material from any suitable angle (e.g., orthogonal sampling) to create the first visual representation 514 and/or the virtual object 516 (or first visual representation 414 and/or virtual object 416).

Figure 6A:
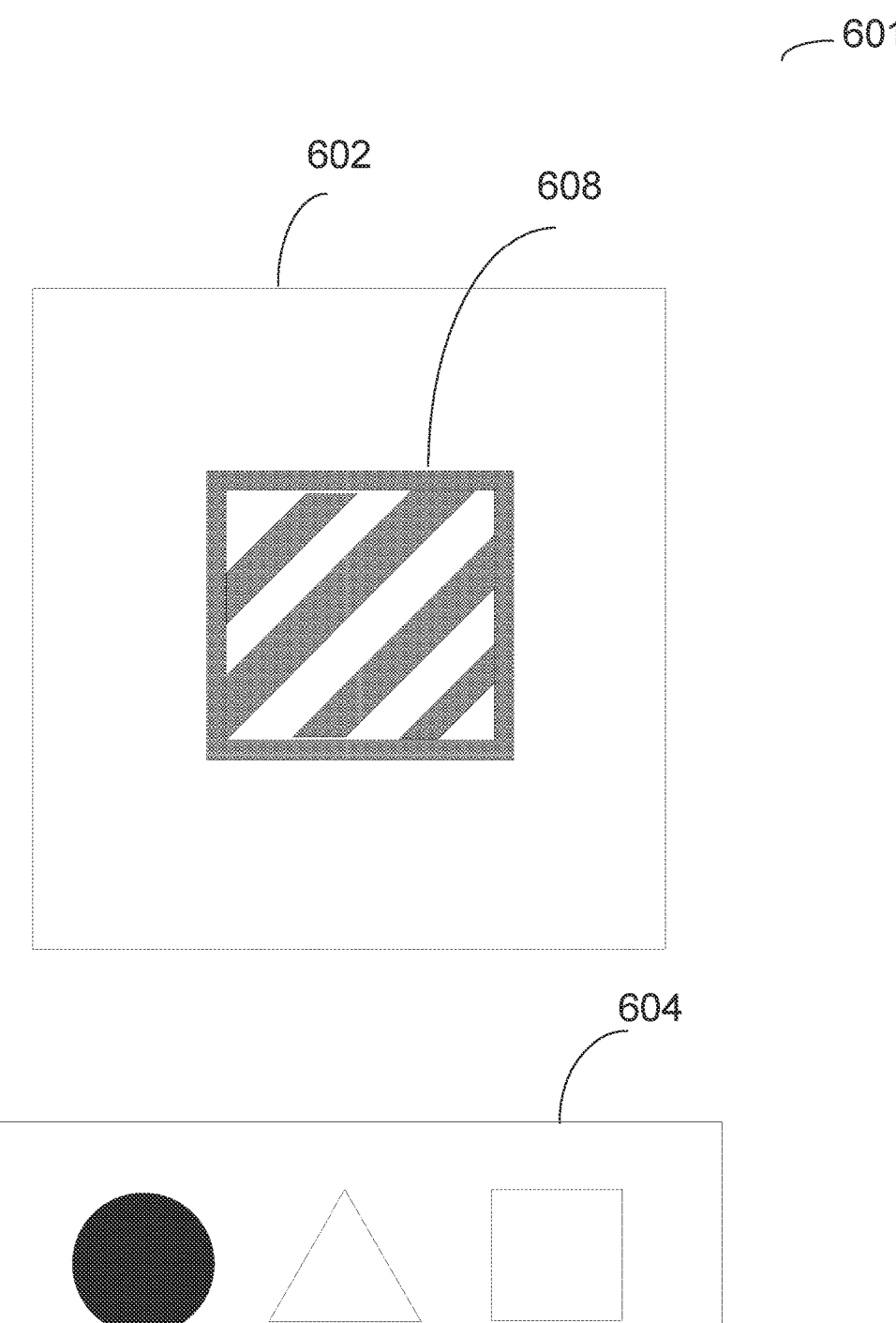
Figure 6B:
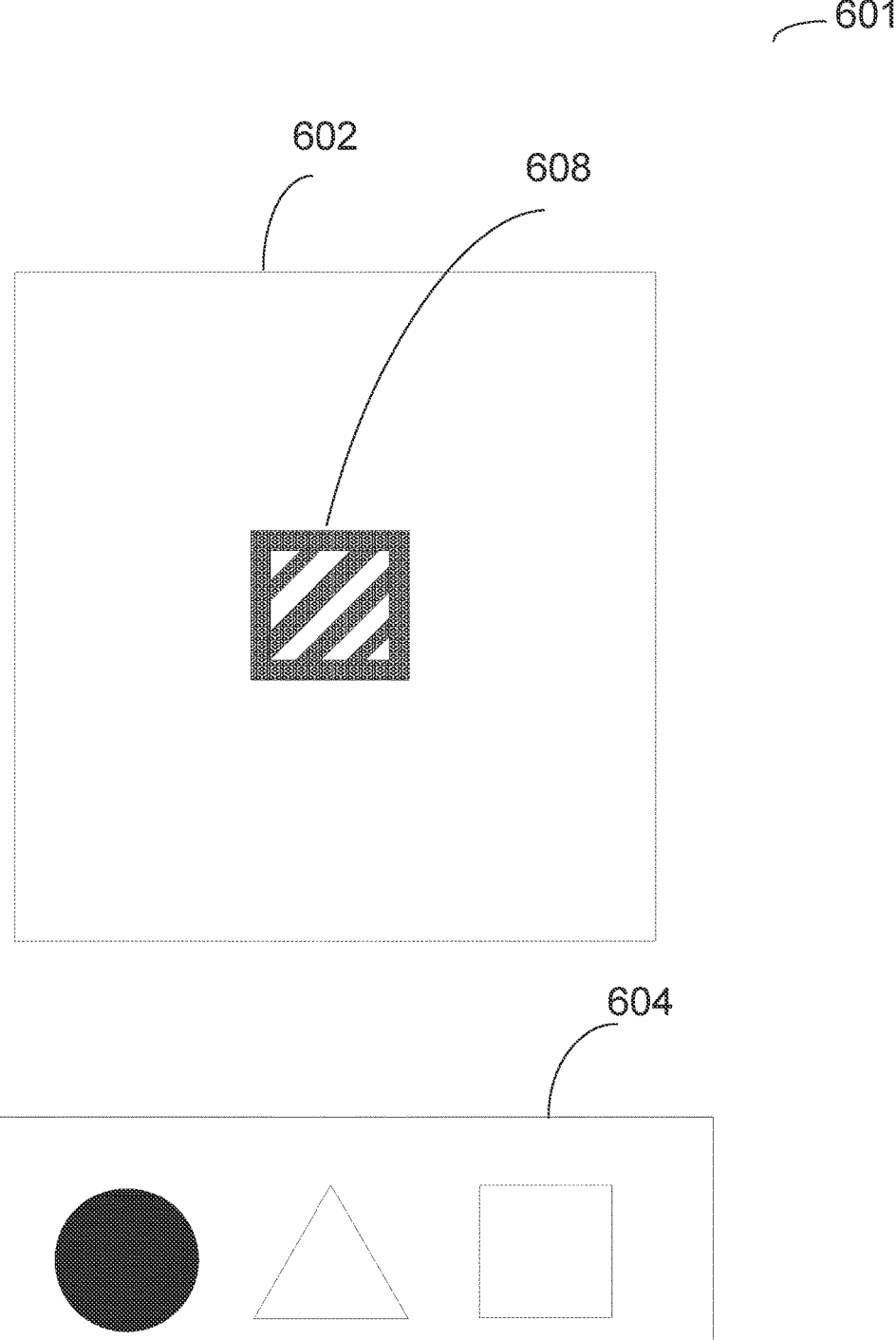

FIGS. 6A-6C illustrate respective user interface elements representing a sampling area in accordance with some examples of the disclosure. The device 200 optionally changes one or more characteristics of the user interface element representing the sampling area to indicate the quality of the sampling. For example, the quality of the sampling may change depending on various factors such as the detail level and/or shape of the object to be sampled (e.g., solid color, flat texture may be easier to sample than a textured, curved surface with a fine pattern), the distance between the device and the object to be sampled, and/or the orientation of the device relative to the object to be sampled, among other possibilities. In some examples, changing the characteristic(s) of the user interface element representing the sampling area can include adjusting a pattern, shape, size and/or color of the user interface element representing the sampling area to indicate an expected quality of the sampling. In some examples, the device 200 can adjust a size of the user interface element representing the sampling area in response to user input (e.g., detected at an input device). In some examples, the orientation of the user interface element 608 representing the sampling area can be tuned (e.g., without user input or in response to user input) to the geometry (e.g., the surface area) of the real-world object 602. In some examples, the device 200 can adjust (e.g., without user input or in response to user input) an orientation of the user interface element representing the sampling area. For example, when the real-world object is a wall including a repeating pattern and the orientation of the user interface element representing the sampling area is not normal to the wall, the device 200 can adjust the orientation of the user interface element representing the sampling area (e.g., to be normal to the surface area of the wall) in order to obtain a sample that has a similar or identical pattern with similar or identical characteristics (e.g., the pattern on the sample is the same as or similar to the corresponding to the sampled portion of the wall).

FIG. 6A illustrates a user interface element 608 representing a sampling area of the real-world object 602 in the three-dimensional environment 601. When one or more criteria are satisfied, indicating a first level of quality (e.g., high fidelity), the user interface element 608 representing a sampling area can have a first appearance. For example, the user interface element 608 representing a sampling area can have a specific color (e.g., green), highlighting or a brightening of color, a different pattern (e.g., the diagonal stripes), different border thickness, etc. among other possible characteristics of appearance. The one or more criteria can include a criterion based on a distance between device 200 and real-world object 602, which is satisfied when the device 200 is less than a first threshold distance (e.g., 1 cm, 1 m, 10 m, etc.) and greater than a second threshold distance (e.g., 100 mm, 1 cm, 1 m, etc.) from the real-world object 602. The one or more criteria can include a criterion based on a size of the user interface element 608 representing the sampling area, which is satisfied when the user interface element 608 representing the sampling area is less than a first threshold size (e.g., 50%, 70%, 100%, or 200% in size of the real-world object 602) and greater than a second threshold size (e.g., 10%, 20%, 50%, 100% in size of the real-world object 602). FIG. 6A illustrates a three-dimensional environment 601 including a user interface 604 including selectable options corresponding to the user interface 404, the details of which are not repeated for brevity. In some examples, three-dimensional environment 601 does not include user interface 604, (e.g., three-dimensional environment 601 includes a user interface element 608 representing a sampling area of the real-world object 602 in the three-dimensional environment 601 without including user interface 604 including selectable options corresponding to the user interface 404). In some examples, three-dimensional environment 601 includes user interface 604 including selectable options corresponding to the user interface 404.

FIG. 6B illustrates the user interface element 608 representing a sampling area of the real-world object 602 in the three-dimensional environment 601 having a different appearance than in FIG. 6A. When the one or more criteria described in FIG. 6A are not satisfied, indicating a second level of quality (e.g., low fidelity), the user interface element 608 representing the sampling area can have a second appearance. For example, the user interface element 608 representing the sampling area can have a specific color (e.g., red or yellow), highlighting or a brightening of color, a different pattern (e.g., the diagonal stripes), different border thickness, etc. among other possible characteristics of appearance. The one or more criteria are optionally not satisfied because the device 200 is greater than the first threshold distance (e.g., far) from the real-world object 602. The one or more criteria are optionally not satisfied because the user interface element 608 representing the sampling area is (e.g., reduced in size) less than the second threshold size.

FIG. 6C illustrates the user interface element 608 representing a sampling area of the real-world object 602 in the three-dimensional environment 601 having a different appearance than in FIGS. 6A and 6B. When the one or more criteria described in FIG. 6A are not satisfied, indicating a second level of quality (e.g., low fidelity), the user interface element 608 representing the sampling area can have a third appearance. For example, the user interface element 608 representing the sampling area can have a specific color (e.g., red or yellow), highlighting or a brightening of color, a different pattern (e.g., the diagonal stripes), different border thickness, etc. among other possible characteristics of appearance. The one or more criteria are not satisfied because the device 200 is less than the second threshold distance from (e.g., close to) the real-world object 602. The one or more criteria are not satisfied because the user interface element 608 representing the sampling area is greater (e.g., increased in size) than the first threshold size.

FIGS. 7A-7B illustrate exemplary ways for creating content (e.g., generating a virtual object) by duplicating a real-world object in accordance with some examples of the disclosure. FIG. 7A illustrates a three-dimensional environment 701 that includes user interface 704 with selectable options 706, 708, 710, and 712 contextualized or updated according to a real-world object 702 (e.g., potted plant). As discussed above, the user interface 704 is optionally presented in response to receiving the selection of the real-world object 702 or presented without first selecting the real-world object 702. The user interface 704 optionally includes a first option 706 contextualized to a first portion of the real-world object 702 (e.g., petals of the potted plant), a second option 708 contextualized to a second portion of the real-world object 702 (e.g., stem of the potted plant), a third option 710 contextualized to a third portion of the real-world object 702 (e.g., pot of the potted plant), and a fourth option 712 corresponding to duplicating the real-world object 702. In some examples, an appearance (e.g., graphical representation) of the first option 706 resembles the first portion of the real-world object 702 (e.g., petals of the potted plant). In some examples, an appearance (e.g., graphical representation) of the second option 708 resembles the second portion of the real-world object 702 (e.g., stem of the potted plant). In some examples, an appearance (e.g., graphical representation) of the third option 710 resembles the third portion of the real-world object 702 (e.g., pot of the potted plant). In some examples, an appearance (e.g., graphical representation) of the fourth option 710 resembles the real-world object 702 (e.g., potted plant). In some examples, the appearance (e.g., graphical representation) of the fourth option 710 does not resemble any characteristic of the real-world object 702. In some examples, the user interface 704 optionally includes any suitable number of options based on the number of portions corresponding to the real-world object 702 (e.g., 6 options when a real-world object includes 5 portions or 10 options when a real-world object includes 9 portions).

As illustrated, a visual appearance of the fourth option 712 of the user interface 704 is emphasized (e.g., represented in FIG. 7A by black solid fill), indicating selection of the fourth option. In some examples, in response to receiving a selection of the fourth option 712, the device 200 generates and/or presents content (e.g., potted plant with flower petals) that is a duplicate (e.g., exact copy) of the real-world object 702 (e.g., potted plant with flower petals). That is, the content (e.g., the virtual object) shares the same characteristics as the real-world object 702. In some examples, in response to receiving a selection of the fourth option 712, the device 200 generates and/or presents content (e.g., a virtual object) that is similar to the real-world object 702. That is, the content (e.g., the virtual object) includes one or more characteristics similar to the real-world object 702 and one or more characteristics different from the real-world object 702.

Accordingly, FIG. 7B illustrates the content 714 (e.g., potted plant with leaves) similar to the real-world object 702 (e.g., not an exact copy of the potted plant with flower petals) in accordance with a selection of the fourth option 712. It can be appreciated that creating a virtual object using a real-world object as a base design can improve the user experience when creating virtual objects. Rather than having to create a virtual object from scratch or selecting a virtual object from a library with limited number of predefined options, a user can easily draw on real-world objects for inspiration, but also create and customize virtual objects based on these real-world objects.

FIGS. 8A-8D illustrate exemplary ways for generating content (e.g., a virtual object) based on respective portions of a real-world object in accordance with some examples of the disclosure. FIGS. 8A-8D illustrate a three-dimensional environment 801 including a user interface 804 with selectable options 806, 808, 810, and 812 for generating a virtual object based on a real-world object 802 (e.g., potted plant). As discussed above, user interface 804 is optionally presented in response to receiving the selection of the real-world object 802 or presented without first selecting the real-world object 802. The user interface 804 optionally includes a first option 806 contextualized to a first portion of the real-world object 802 (e.g., petals of the potted plant), a second option 808 contextualized to a second portion of the real-world object 802 (e.g., stem of the potted plant), a third option 810 contextualized to a third portion of the real-world object 802 (e.g., pot of the potted plant), and a fourth option 812 corresponding to duplicating the real-world object 802 In FIG. 8A, a visual appearance of the third option 810 is emphasized (e.g., represented in FIG. 8A by black solid fill), indicating selection of the third option 810.

Based on the selection of the third option, FIG. 8B illustrates content 814 corresponding to the third portion of the real-world object 802 (e.g., pot of the potted plant). In some examples, the content 814 optionally has a material of the third portion of the real-world object 802 (e.g., pot of the potted plant). In some examples, the content 814 optionally has structure of the third portion of the real-world object 802 (e.g., pot of the potted plant). In some examples, the content 814 optionally has the material and structure of the third portion of the real-world object 802 (e.g., pot of the potted plant). In some examples, the device optionally adjusts the size, shape, position, orientation and/or color of the content 814 having the structure and/or material of the pot of the potted plant based on user input (e.g., provided by an input device or a portion (e.g., hand) of the user). For example, the user can draw an outline of an edge of the pot and the device 200 can automatically mirror and fill-in the rest of the 3-dimensional shape of the pot. In FIG. 8B, the device 200 optionally receives input for a selection of the second option 808 corresponding to the second portion of the real-world object 802 (e.g., stem of the potted plant). As such in FIG.

8B, a visual appearance of the second option 808 in the user interface 804 is emphasized (e.g., represented in FIG. 8B by black solid fill).

Figure 8C:
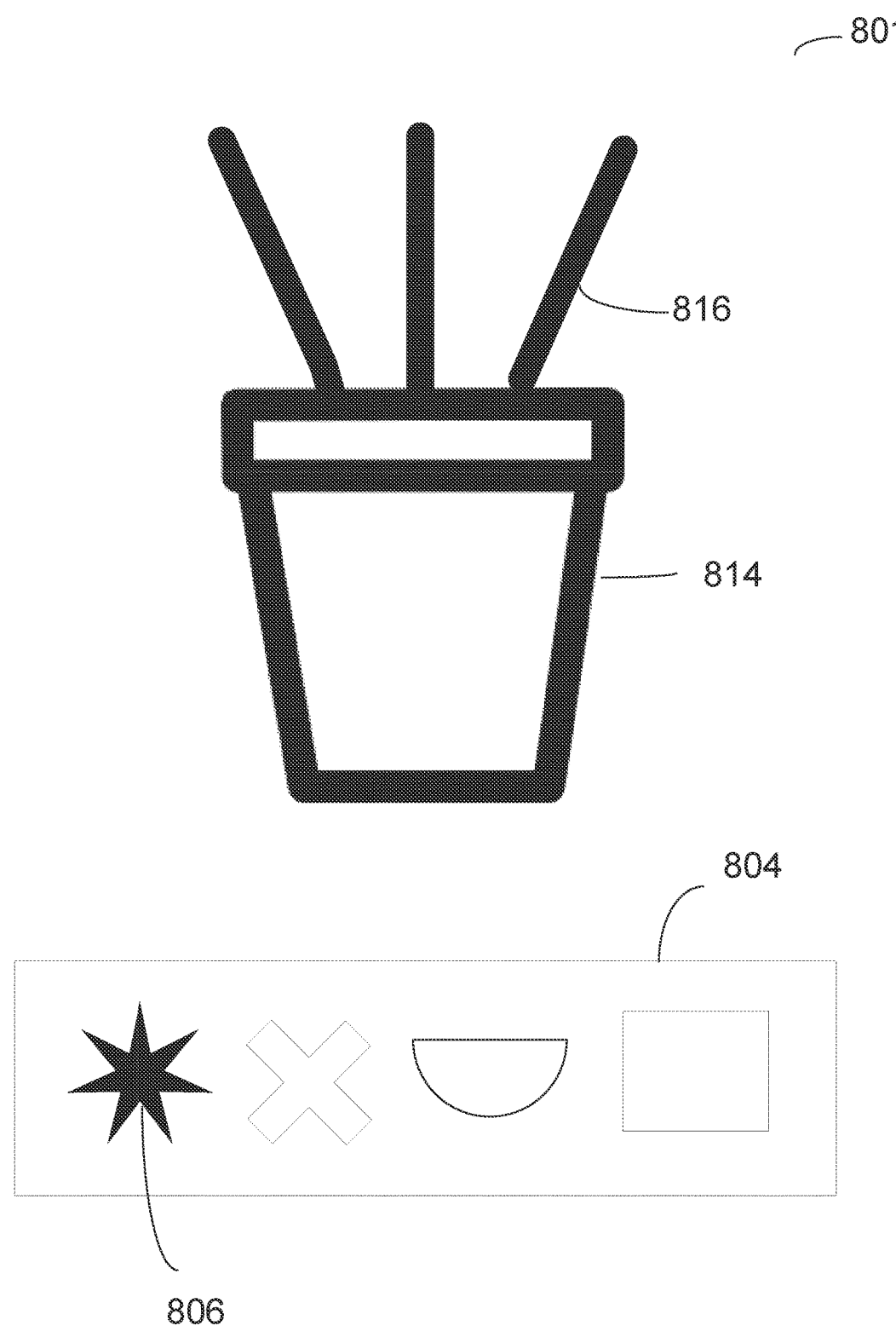

Based on the selection of the second option 808, FIG. 8C illustrates content 816 corresponding to the second portion of the real-world object 802 (e.g., stem of the potted plant) in addition to the content 814 corresponding to the third portion of the real-world object 802 (e.g., pot of the potted plant). In some examples, the content 816 optionally has a material of the second portion of the real-world object 802 (e.g., stem of the potted plant). In some examples, the content 816 optionally has a structure of the second portion of the real-world object 802 (e.g., stem of the potted plant). In some examples, the content 816 optionally has the material and structure of the second portion of the real-world object 802 (e.g., stem of the potted plant). Similar to adjusting the content 814 described in FIG. 8B, the device can optionally adjust the content 816. In FIG. 8C, the device 200 optionally receives input for a selection of the first option 806 corresponding to the first portion of the real-world object 802 (e.g., petals of the potted plant). As such in FIG. 8C, a visual appearance of the first option 806 in the user interface 804 is emphasized (e.g., represented in FIG. 8C by black solid fill).

Figure 8D:
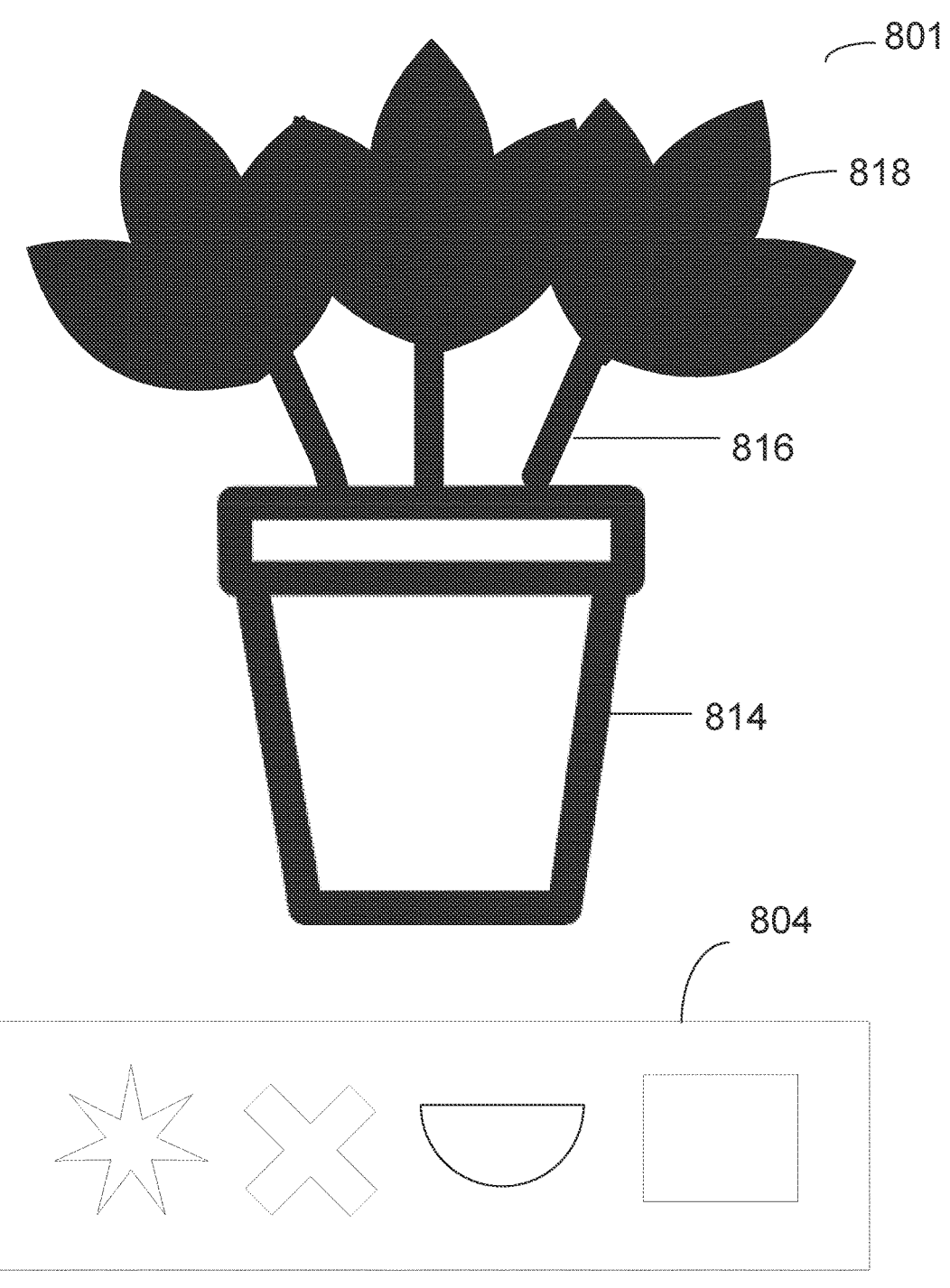

Based on the selection of the first option 806, FIG. 8D illustrates content 818 corresponding to the first portion of the real-world object 802 (e.g., petals of the potted plant) in addition to the content 814 corresponding to the third portion of the real-world object 802 (e.g., pot of the potted plant) and the content 816 corresponding to the second portion of the real-world object 802 (e.g., stem of the potted plant). In some examples, the content 818 optionally has a material of the first portion of the real-world object 802 (e.g., petals of the potted plant). In some examples, the content 818 optionally has a structure of the first portion) of the real-world object 802 (e.g., petals of the potted plant). In some examples, the content 818 optionally has the material and structure first portion of the real-world object 802 (e.g., petals of the potted plant). Similar to adjusting the content 814 and the content 816 described in FIGS. 8B-8C, the device can optionally adjust the content 818.

Figure 9A:
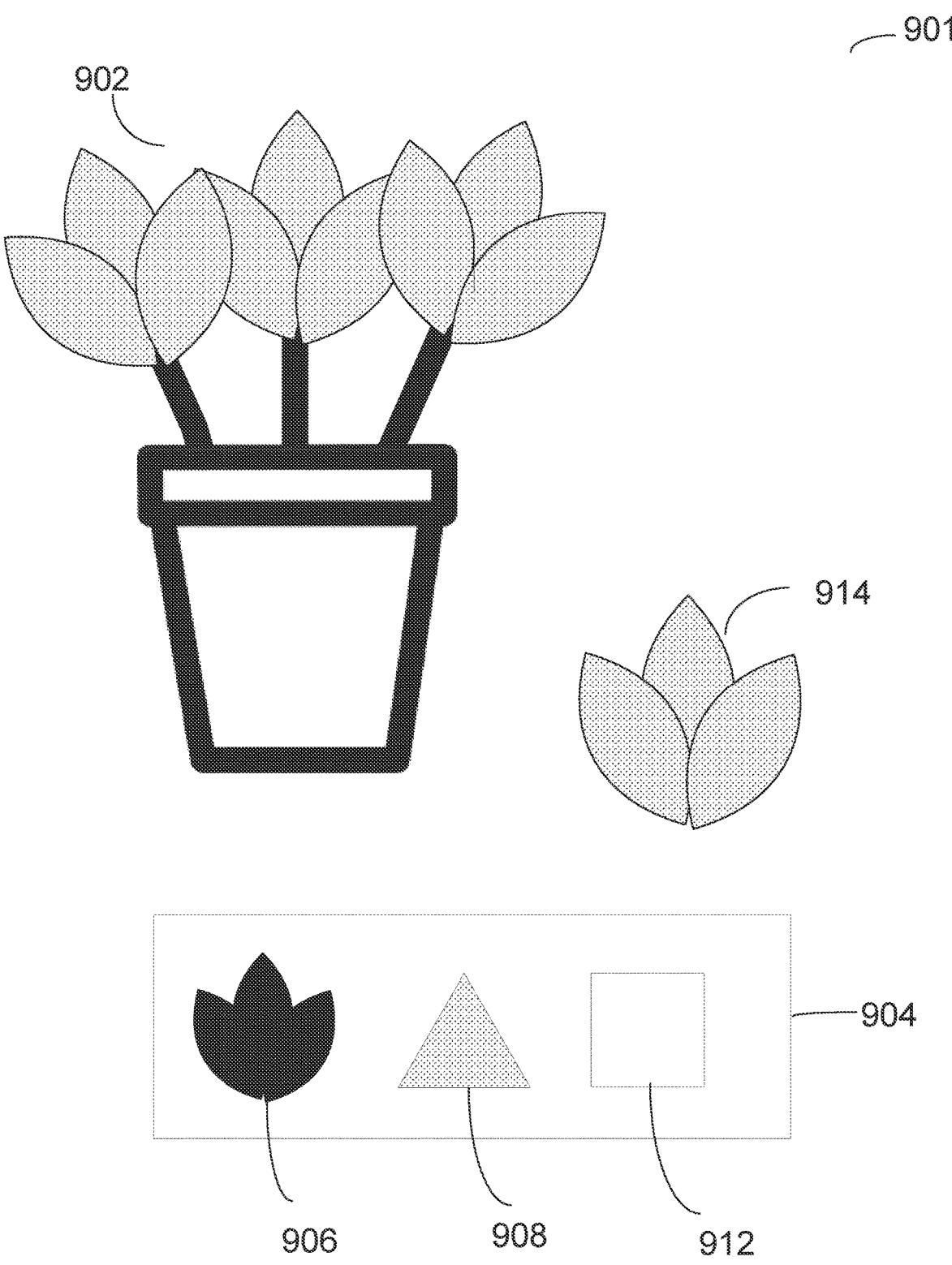
FIGS. 9A-9B illustrate exemplary ways for generating a virtual object based on a user interface updated according to a selection of a portion of a real-world object in accordance with some examples of the disclosure.
Figure 9B:
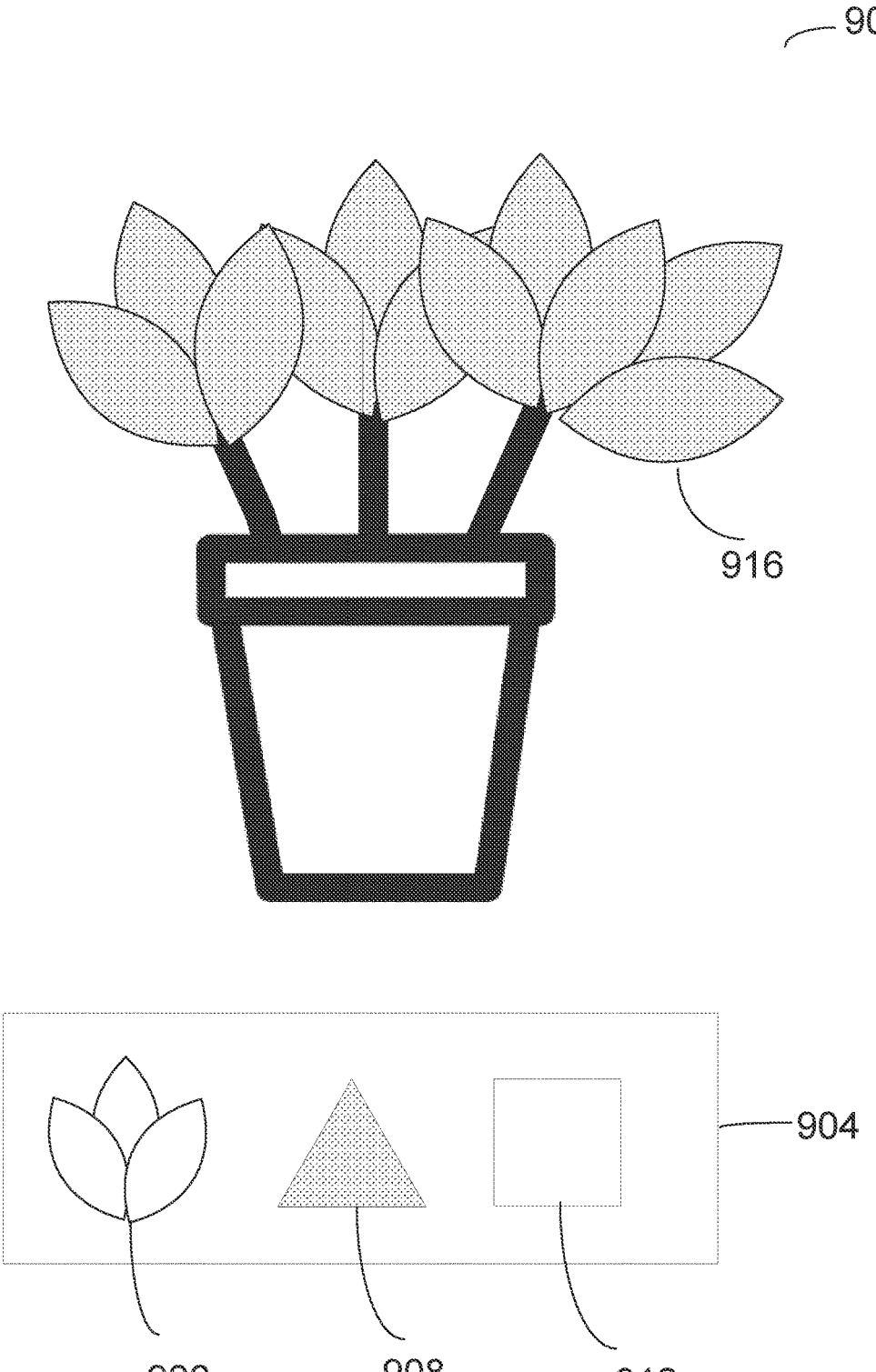

FIGS. 9A-9B illustrate exemplary ways for generating content (e.g., a virtual object) based on updating a user interface according to a selection of a portion of a real-world object in accordance with some examples of the disclosure. As discussed above, user interface 904 is optionally presented in a three-dimensional environment 901 in response to receiving the selection of the real-world object 902 or presented without first selecting the real-world object 902. Because a respective portion of the real-world object 902 (e.g., petals of the potted flowers) is selected, FIG. 9A illustrates an updated user interface 904 and corresponding options contextualized to the respective portion of the real-world object 902 (e.g., petals of the potted plant). The updated user interface 904 optionally includes a first option 906 corresponding to creating content having a material (e.g., dotted texture) of the petals of the potted plant, a second option 908 corresponding to creating content having a structure of the petals of the potted plant, and a third option 912 corresponding to creating content by duplicating the petals of the potted plant. In some examples, in addition to updating the user interface 904 according to the selection of the real-world object 902, the device 200 can present a visual representation 914 (e.g., two-dimensional wireframe, three-dimensional wireframe) corresponding to the structure of the petals of the real-world object 902 in the three-dimensional environment 901 in response to receiving user input for the selection of petals of the real-world object 902. In some examples, the visual representation 914 can serve as a preview for a user before the user makes a selection to add the virtual object to the three-dimensional; environment 901. It can be appreciated that visual appearances corresponding to the options 906, 908, and 912 are optionally updated according to the selection of the petals of the real-world object 902. For example, a visual appearance of the first option 906 optionally corresponds to a material of the petals of the real-world object 902. A visual appearance of the second option 908 optionally corresponds to a structure (e.g., wireframe) of the petals of the real-world object 902. A visual appearance of the third option 912 optionally corresponds to a material and/or structure (e.g., wireframe) of the petals of the real-world object 902. In some examples, the visual appearance of the third option 912 optionally includes a predetermined visual appearance that does not correspond the material and/or structure (e.g., wireframe) of the petals of the real-world object 902.

In some examples, given a selection of another portion of the real-world object 902 (e.g., the stem of the potted plant), the updated user interface 904 can include the first option 906 corresponding to creating content having a material of the stem of the potted plant, a second option 908 corresponding to creating content having a structure of the stem of the potted plant, and a third option 912 corresponding to creating content by duplicating the stem of the potted plant. In some examples, given a selection of another portion of the real-world object 902 (e.g., the pot of the potted plant), the updated user interface 904 can includes the first option 906 corresponding to creating content having a material of the pot of potted plant, a second option 908 corresponding to creating content having a structure of the pot of the potted plant, and a third option 912 corresponding to creating content by duplicating the pot of the potted plant.

As illustrated, the visual appearance of the first option 906 is emphasized (e.g., represented in FIG. 9A by black solid fill) in the user interface 904. According to the selection of the first option 906, FIG. 9B illustrates the content 916 corresponding to the material of the petals of the real-world object 902. In some examples, the device 200 can adjust the size, orientation, color, and/or shape of the content 916 based on user input. For example, a user can sketch (e.g., create content 916 with) a flower of the potted plant with additional petals compared to the same flower of the real-world object 902 of FIG. 9B such that the additional petals correspond to the material of the flower of the real-world object 902.

In some examples, a user interface (e.g., user interface 304, 404, 504, 604, 704, 804, and/or 904) includes a respective selectable option for sampling a property of a selected object (e.g., real-world object 702). For example, when the object of sampling is emitting audio (e.g., a speaker device that is emitting sound), in response to receiving a selection of the respective selectable option, the device 200 optionally samples the audio and can apply the audio (or similar audio based on the sampled audio) to another object or environment. As another example, when the object of sampling is emitting light (e.g., a lamp that is emitting light of one or more colors), in response to receiving a selection of the respective selectable option, the device 200 optionally samples the light and can apply the light (or similar lighting based on the sampled light) to another object or environment. As another example, when the object of sampling is displaying one or more images (e.g., a monitor that is visually playing a video or photos), in response to receiving a selection of the respective selectable option, the device 200 optionally samples the one or more images and can apply the one or more images (or similar images or video based on the sampled one or more images), optionally with any corresponding sound of the one or more images, to another object or environment. As another example, when the object of sampling is projecting one or more shadows (e.g., a window that is projecting shadows), in response to receiving a selection of the respective selectable option, the device 200 optionally samples the one or more shadows and can apply the one or more shadows (or similar shadowing based on the sampled shadows) to another object or environment. As another example, when the object of sampling is showing a time (e.g., a working watch or clock), in response to receiving a selection of the respective selectable option, the device 200 optionally samples the time and can apply clock functionality (e.g., display a clock showing a current time) or similar functionality based on the sampled clock functionality to another object or environment. It is understood that the above properties are examples of sampleable properties that may be specialized for specific objects that are sampled, but that other properties are possible.

Figure 10:
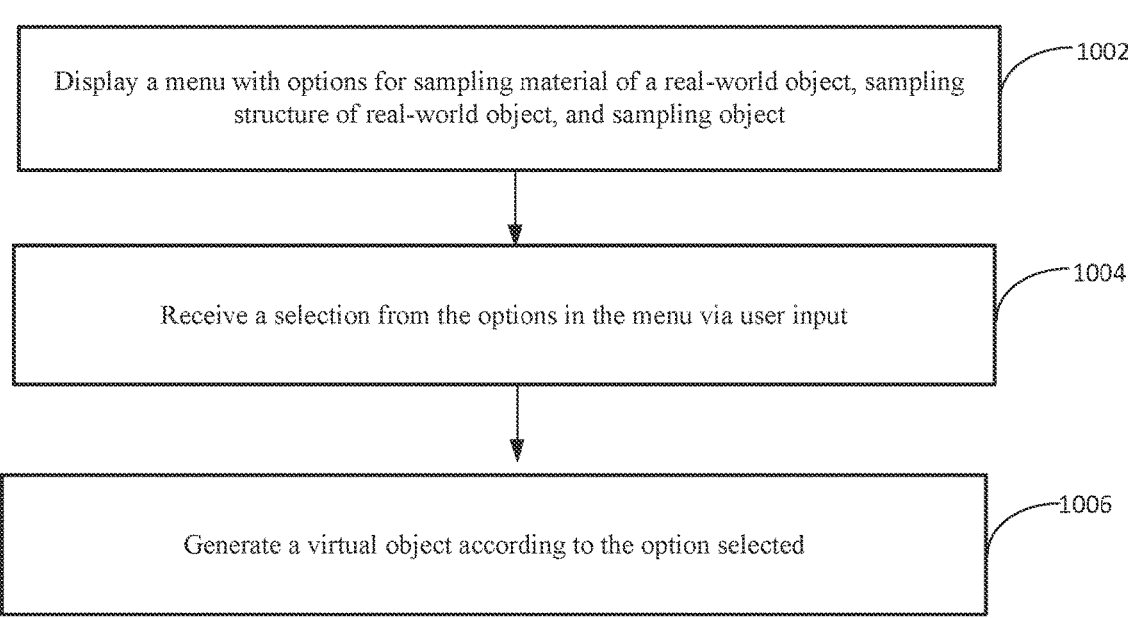
FIG. 10 illustrates a method for generating a virtual object in accordance with some examples of the disclosure.

FIG. 10 illustrates an exemplary method 1000 for creating content (e.g., generating a virtual object) in accordance with some examples of the disclosure. In some examples, the method 1000 is performed at an electronic device (e.g., device 200 in FIG. 2A such as a tablet, smartphone, wearable computer, or head mounted device) including a display generation component (e.g., display generation component 214 in FIG. 2A (e.g., a heads-up display, a display, a touchscreen, a projector, etc.)) and one or more cameras (e.g., a camera (e.g., color sensors, infrared sensors, and other depth-sensing cameras) that points downward at a user's hand or a camera that points forward from the user's head). In some examples, the method 1000 is governed by instructions and/or programs that are stored in a non-transitory computer-readable storage medium and that are executed by one or more processors of a computer system, such as the one or more processors 218 of device 200. Some operations in method 1000 are optionally combined and/or omitted. In some examples, the order of some operations in method 1000 are optionally changed.

In FIG. 10, the method 1000 includes, at block 1002, displaying a menu (or other user interface) with options for sampling a material of a real-world object, sampling a structure of a real-world object, and duplicating the real-world object (e.g., creating a virtual object that is similar to the real-world object or creating a virtual object that is an exact replica of the real-world object). In some examples, the menu is displayed in a content creation mode. In some examples, the electronic device displays the menu in response to receiving a selection of the real-world object (e.g., attention of the user directed towards the real-world object, a portion such as a hand of the user pointing or in direct contact with the real-world object, and/or an input device pointing or in direct contact with the real-world object). In some examples, the menu and respective options are contextualized or updated according to the selection of the real-world object. At block 1004, after displaying the menu, the electronic device optionally receives user input for a selection of an option from the options displayed in the menu.

At block 1006, in accordance with the selection of the option, the electronic device optionally generates a virtual object according to the option selected. In some examples, the electronic device can create content having a material and/or structure of the real-world object. In some examples, the electronic device can create content similar to the real-world object or an exact copy of the real-world object. It should be understood that the particular order of the description of the operations in FIG. 10 is merely exemplary and is not intended to indicate that the described order is the only order in which the operations could be performed. One of ordinary skill in the art would recognize various ways to reorder the operations described herein.

FIG. 11 illustrates an example method 1100 for creating content having a material of a real-world object in accordance with some examples of the disclosure. The method 1100 is optionally performed at an electronic device such as device 200. Some operations in process 1100 are optionally combined and/or optionally omitted. The order of some operations in process 1100 is optionally changed, in some examples. As described with respect to block 1002, at block 1102, the electronic device presents a menu with options for sampling material of a real-world object, sampling structure of real-world object, and duplicating the real-world object (e.g., creating a virtual object that is similar to the real-world object or creating a virtual object that is an exact replica of the real-world object). As described with respect to block 1004, at block 1104, after displaying the menu, the electronic device optionally receives user input for a selection of an option from the options displayed in the menu. The selected option can correspond to sampling material of the real-world object.

At block 1106, the electronic device displays a preview of sampled material of the real-world object based on receiving the first user input. The preview is optionally two-dimensional or three-dimensional. In some examples, based on user input (e.g., by pressing on a button on an input device or holding a pinch gesture), the electronic device can display the preview of the sampled material. At block 1108, the electronic device can display a representation of an initial shape based on the sampled material of the real-world object. The initial shape optionally includes a two-dimensional (e.g., circle, or any suitable shape) or three-dimensional (e.g., sphere, or any suitable shape) shape. At block 1110, based on user input (e.g., by pressing on a button on an input device while moving the input device or holding a pinch gesture while moving a hand), the electronic device can create a virtual object having the material and/or texture of the real-world object. It should be understood that the particular order of the description of the operations in FIG. 11 is merely exemplary and is not intended to indicate that the described order is the only order in which the operations could be performed. One of ordinary skill in the art would recognize various ways to reorder the operations described herein.

Figure 12:
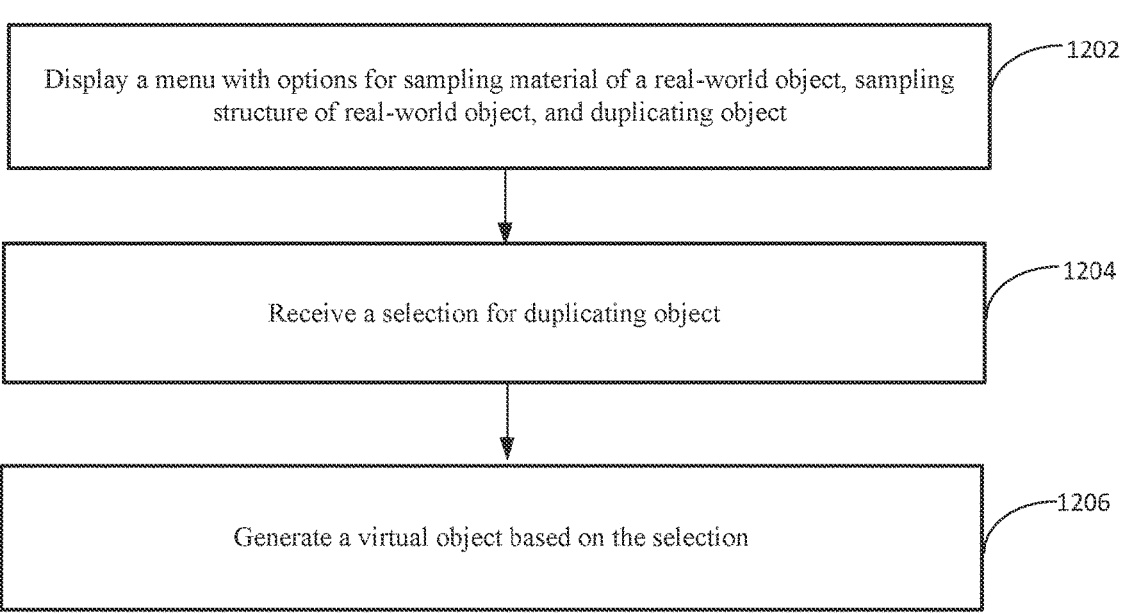
FIG. 12 illustrates another method for duplicating a real-world object in accordance with some examples of the disclosure.

FIG. 12 illustrates an example method 1200 for creating content by duplicating a real-world object in accordance with some examples of the disclosure. The method 1200 is optionally performed at an electronic device such as device 200. Some operations in process 1200 are optionally combined and/or optionally omitted. The order of some operations in process 1200 is optionally changed, in some examples. As described with respect to blocks 1002 and 1102, at block 1202, the electronic device presents a menu with options for sampling material of a real-world object, sampling structure of real-world object, and duplicating the real-world object (e.g., creating a virtual object that is similar to the real-world object or creating a virtual object that is an exact replica of the real-world object). As described with respect to blocks 1004 and 1104, at block 1204, after displaying the menu, the electronic device optionally receives user input for a selection of an option from the options displayed in the menu. The option can correspond to duplicating the real-world object.

At block 1206, based on receiving the option for duplicating the real-world object, the electronic device can create a virtual object that is similar to the real-world object or an exact copy of the real-world object. It should be understood that the particular order of the description of the operations in FIG. 12 is merely exemplary and is not intended to indicate that the described order is the only order in which the operations could be performed. One of ordinary skill in the art would recognize various ways to reorder the operations described herein.

FIG. 13 illustrates an example method 1300 for creating content based on a portion of the real-world object in accordance with some examples of the disclosure. The method 1300 is optionally performed at an electronic device such as device 200. Some operations in process 1300 are optionally combined and/or optionally omitted. The order of some operations in process 1300 is optionally changed, in some examples. At block 1302, the electronic device receives user input for a selection of a portion of a real-world object. At block 1304, the electronic device updates and/or presents a menu with options for sampling material of the selected portion, sampling structure of selected portion, and duplicating the selected portion (e.g., creating a virtual object that is similar to selected portion or creating a virtual object that is an exact replica of the selected portion). At block 1306, after updating and/or displaying the menu, the electronic device optionally receives user input for a selection of an option from the options displayed in the menu. For example, the selected option can correspond to sampling structure of selected portion.

At block 1308, based on receiving the selected option for sampling structure of selected portion, the electronic device can create content having the structure of the selected portion. It should be understood that the particular order of the description of the operations in FIG. 13 is merely exemplary and is not intended to indicate that the described order is the only order in which the operations could be performed. One of ordinary skill in the art would recognize various ways to reorder the operations described herein.

Therefore, according to the above, some examples of the disclosure are directed to a method including an electronic device in communication with a display and one or more input devices. The method includes detecting a real-world object; presenting, via the display, a user interface with a plurality of user interface elements for generating a virtual object corresponding to the detected real-world object; receiving, via the one or more input devices, a first input including a selection of a first portion of the real-world object; and updating an appearance of a first user interface element of the plurality of user interface elements in the user interface in accordance with the selection of the first portion of the real-world object to include a characteristic corresponding to the first portion of the real-world object. Additionally or alternatively to one or more of the examples disclosed above, in some examples, the method further includes receiving, via the one or more input devices, a second input including a selection of the first user interface element and including movement; and generating the virtual object having the characteristic corresponding to the real-world object in accordance with the first user interface element and the movement. Additionally or alternatively to one or more of the examples disclosed above, in some examples, the first user interface element corresponds to creating content corresponding to a structure of the first portion of the real-world object. Additionally or alternatively to one or more of the examples disclosed above, in some examples, updating the appearance of the first user interface element of the plurality of user interface elements in the user interface includes updating from a first visual appearance to a second visual appearance different than the first visual appearance. Additionally or alternatively to one or more of the examples disclosed above, in some examples, the first visual appearance comprises a wireframe drawing of the structure of the real-world object, and the second visual appearance comprises a wireframe drawing of the structure of the first portion of the real-world object. Additionally or alternatively to one or more of the examples disclosed above, in some examples, the method further includes updating an appearance of a second user interface element of the plurality of user interface elements in the user interface in accordance with the selection of the first portion of the real-world object to include the characteristic corresponding to the real-world object. Additionally or alternatively to one or more of the examples disclosed above, in some examples, the second user interface element corresponds to creating content corresponding to a material of the first portion of the real-world object. Additionally or alternatively to one or more of the examples disclosed above, in some examples, updating the appearance of the second user interface element comprises updating from a first visual appearance to a second visual appearance different from the first visual appearance. Additionally or alternatively to one or more of the examples disclosed above, in some examples, the first visual appearance comprises a two-dimensional representation of the material of the first portion of the real-world object, and wherein the second visual appearance comprises a three-dimensional representation of the material of the first portion of the real-world object. Additionally or alternatively to one or more of the examples disclosed above, in some examples, method further includes receiving, via the one or more input devices, a second input including a selection of the second user interface element and including movement; and generating the virtual object having the material of the first portion of the real-world object in accordance with the selection of second user interface element and the movement. Additionally or alternatively to one or more of the examples disclosed above, in some examples, the plurality of user interface elements includes a third user interface element, and the method further includes forgoing updating an appearance of the third user interface element in accordance with the selection of the first portion of the real-world object. Additionally or alternatively to one or more of the examples disclosed above, in some examples, the third user interface element corresponds to creating content by duplicating the first portion of the real-world object or the real-world object. Additionally or alternatively to one or more of the examples disclosed above, in some examples, duplicating the first portion of the real-world object comprises generating the virtual object to include each characteristic of the first portion of the real-world object. Additionally or alternatively to one or more of the examples disclosed above, in some examples, duplicating the first portion of the real-world object comprises generating the virtual object to include one or more first characteristics similar to the first portion of the real-world object and one or more second characteristics different from the first portion of the real-world object. Additionally or alternatively to one or more of the examples disclosed above, in some examples, the method further includes receiving, via the one or more input devices, a second input including a selection of a second portion of the real-world object; and updating the appearance of the first user interface element of the plurality of user interface elements in the user interface in accordance with the selection of second portion of the real-world object to include a characteristic corresponding to the second portion of the real-world object. Some examples of the disclosure are directed to a non-transitory computer readable storage medium storing instructions configured to be executed by one or more processors of the system to cause the processor(s) to perform any of the above operations of the system.

Some examples of the disclosure are directed to an electronic device comprising a display, wherein the electronic device is in communication with one or more input devices, and wherein the electronic device further comprises one or more processors configured to perform a method comprising detecting a real-world object; presenting, via the display, a user interface with a plurality of user interface elements for generating a virtual object corresponding to the detected real-world object; receiving, via the one or more input devices, a first input including a selection of a first portion of the real-world object; and updating an appearance of a first user interface element of the plurality of user interface elements in the user interface in accordance with the selection of the first portion of the real-world object to include a characteristic corresponding to the first portion of the real-world object. Additionally or alternatively to one or more of the examples disclosed above, in some examples, the method further comprises receiving, via the one or more input devices, a second input including a selection of the first user interface element and including movement; and generating the virtual object having the characteristic corresponding to the real-world object in accordance with the first user interface element and the movement. Additionally or alternatively to one or more of the examples disclosed above, in some examples, the first user interface element corresponds to creating content corresponding to a structure of the first portion of the real-world object.

Some examples of the disclosure are directed to a non-transitory computer readable storage medium storing one or more programs, the one or more programs comprising instructions, which when executed by one or more processors of an electronic device that is in communication with a display and one or more input devices, cause the electronic device to perform a method comprising detecting a real-world object, presenting, via the display, a user interface with a plurality of user interface elements for generating a virtual object corresponding to the detected real-world object, receiving, via the one or more input devices, a first input including a selection of a first portion of the real-world object; and updating an appearance of a first user interface element of the plurality of user interface elements in the user interface in accordance with the selection of the first portion of the real-world object to include a characteristic corresponding to the first portion of the real-world object. Additionally or alternatively to one or more of the examples disclosed above, the method further comprises receiving, via the one or more input devices, a second input including a selection of the first user interface element and including movement; and generating the virtual object having the characteristic corresponding to the real-world object in accordance with the first user interface element and the movement.

Some examples of the disclosure are directed to a method including an electronic device in communication with a display and one or more input devices. The method includes detecting a real-world object; receiving, via the one or more input devices, a first input including a selection of the real-world object; and presenting, via the display, a user interface with a plurality of user interface elements for generating a virtual object corresponding to the real-world object detected by the electronic device, wherein the plurality of user interface elements includes a first user interface element contextualized to a first portion of the real-world object and a second user interface element contextualized to a second portion of the real-world object. Additionally or alternatively to one or more of the examples disclosed above, in some examples, the first user interface element corresponds to creating content using a structure of the first portion of the real-world object, and wherein the second user interface element corresponds to creating content using a structure of the second portion of the real-world object. Additionally or alternatively to one or more of the examples disclosed above, in some examples, the first user interface element corresponds to creating content using a material of the first portion of the real-world object, and wherein the second user interface element corresponds to creating content using a material of the second portion of the real-world object. Additionally or alternatively to one or more of the examples disclosed above, in some examples, the method further includes receiving, via the one or more input devices, a second input including a selection of the first user interface element or the second user interface element and including movement; and generating the virtual object having a characteristic corresponding to the real-world object in accordance with the first user interface element or the second user interface element and the movement. Additionally or alternatively to one or more of the examples disclosed above, in some examples, the plurality of user interface elements comprises a third user interface element that corresponds to creating the virtual object based on the real-world object such that the virtual object comprises at least one characteristic different form the real-world object. Additionally or alternatively to one or more of the examples disclosed above, in some examples, the third user interface element is contextualized to the real-world object, including the first portion of the real-world object and the second portion of the real-world object. Additionally or alternatively to one or more of the examples disclosed above, in some examples, the third user interface element is not contextualized to the real-world object. Additionally or alternatively to one or more of the examples disclosed above, in some examples, the method further includes detecting a second real-world object; receiving, via the one or more input devices, a second input including a selection of the second real-world object; and presenting, via the display, the user interface with the plurality of user interface elements for generating the virtual object corresponding to the second real-world object detected by the electronic device, wherein the plurality of user interface elements includes the first user interface element contextualized to a first portion of the second real-world object and the second user interface element contextualized to a second portion of the second real-world object.

Some examples of the disclosure are directed to an electronic device comprising a display, wherein the electronic device is in communication with one or more input devices, and wherein the electronic device further comprises one or more processors configured to perform a method comprising detecting a real-world object; receiving, via the one or more input devices, a first input including a selection of the real-world object; and presenting, via the display, a user interface with a plurality of user interface elements for generating a virtual object corresponding to the real-world object detected by the electronic device, wherein the plurality of user interface elements includes a first user interface element contextualized to a first portion of the real-world object and a second user interface element contextualized to a second portion of the real-world object. Additionally or alternatively to one or more of the examples disclosed above, in some examples, the first user interface element corresponds to creating content using a structure of the first portion of the real-world object, and the second user interface element corresponds to creating content using a structure of the second portion of the real-world object. Additionally or alternatively to one or more of the examples disclosed above, in some examples, the first user interface element corresponds to creating content using a material of the first portion of the real-world object, and the second user interface element corresponds to creating content using a material of the second portion of the real-world object. Additionally or alternatively to one or more of the examples disclosed above, in some examples, the method further comprises receiving, via the one or more input devices, a second input including a selection of the first user interface element or the second user interface element and including movement; and generating the virtual object having a characteristic corresponding to the real-world object in accordance with the first user interface element or the second user interface element and the movement. Additionally or alternatively to one or more of the examples disclosed above, in some examples, the plurality of user interface elements comprises a third user interface element that corresponds to creating the virtual object based on the real-world object such that the virtual object comprises at least one characteristic different than the real-world object and at least one characteristic similar to the real-world object. Additionally or alternatively to one or more of the examples disclosed above, in some examples, the third user interface element is contextualized to the real-world object, including the first portion of the real-world object and the second portion of the real-world object.

Some examples of the disclosure are directed to a non-transitory computer readable storage medium storing one or more programs, the one or more programs comprising instructions, which when executed by one or more processors of an electronic device that is in communication with a display and one or more input devices, cause the electronic device to perform a method comprising: detecting a real-world object; receiving, via the one or more input devices, a first input including a selection of the real-world object; and presenting, via the display, a user interface with a plurality of user interface elements for generating a virtual object corresponding to the real-world object detected by the electronic device, wherein the plurality of user interface elements includes a first user interface element contextualized to a first portion of the real-world object and a second user interface element contextualized to a second portion of the real-world object. Additionally or alternatively to one or more of the examples disclosed above, in some examples, the first user interface element corresponds to creating content using a structure of the first portion of the real-world object, and the second user interface element corresponds to creating content using a structure of the second portion of the real-world object. Additionally or alternatively to one or more of the examples disclosed above, in some examples, the first user interface element corresponds to creating content using a material of the first portion of the real-world object, and the second user interface element corresponds to creating content using a material of the second portion of the real-world object. Additionally or alternatively to one or more of the examples disclosed above, in some examples, the method further comprises: receiving, via the one or more input devices, a second input including a selection of the first user interface element or the second user interface element and including movement; and generating the virtual object having a characteristic corresponding to the real-world object in accordance with the first user interface element or the second user interface element and the movement. Additionally or alternatively to one or more of the examples disclosed above, in some examples, the plurality of user interface elements comprises a third user interface element that corresponds to creating the virtual object based on the real-world object such that the virtual object comprises at least one characteristic different than the real-world object and at least one characteristic similar to the real-world object. Additionally or alternatively to one or more of the examples disclosed above, in some examples, the third user interface element is contextualized to the real-world object, including the first portion of the real-world object and the second portion of the real-world object.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

The invention claimed is:

1. A method comprising:
at an electronic device in communication with a display and one or more input devices:
detecting a real-world object;
presenting, via the display, a user interface with a plurality of user interface elements for generating a virtual object corresponding to the detected real-world object;
receiving, via the one or more input devices, a first input including a selection of a first portion of the real-world object; and
in response to receiving the first input:
updating an appearance of a first user interface element of the plurality of user interface elements in the user interface to include a first characteristic corresponding to the first portion of the real-world object; and
updating an appearance of a second user interface element of the plurality of user interface elements in the user interface to include a second characteristic, different from the first characteristic, corresponding to the first portion of the real-world object.

2. The method of claim 1, further comprising:
receiving, via the one or more input devices, a second input including a selection of the first user interface element and including movement; and
in response to receiving the second input:
generating the virtual object having the first characteristic corresponding to the real-world object in accordance with the first user interface element and the movement.

3. The method of claim 1, wherein the first user interface element corresponds to creating content corresponding to a structure of the first portion of the real-world object.

4. The method of claim 3, wherein updating the appearance of the first user interface element of the plurality of user interface elements in the user interface comprises updating from a first visual appearance to a second visual appearance different from the first visual appearance.

5. The method of claim 1, wherein the second user interface element corresponds to creating content corresponding to a material of the first portion of the real-world object.

6. The method of claim 1, further comprising:
receiving, via the one or more input devices, a second input including a selection of the second user interface element and including movement; and
in response to receiving the second input:
generating the virtual object having the second characteristic of the first portion of the real-world object in accordance with the selection of second user interface element and the movement.

7. The method of claim 1, wherein the plurality of user interface elements includes a third user interface element, and wherein the method further comprises:
forgoing updating an appearance of the third user interface element in accordance with the selection of the first portion of the real-world object.

8. The method of claim 1, further comprising:
receiving, via the one or more input devices, a second input including a selection of a second portion of the real-world object; and
in response to receiving the second input:
updating the appearance of the first user interface element of the plurality of user interface elements in the user interface to include a characteristic corresponding to the second portion of the real-world object.

9. An electronic device, comprising:
a display;
wherein the electronic device is in communication with one or more input devices, and wherein the electronic device further comprises one or more processors configured to perform a method comprising:
detecting a real-world object;
presenting, via the display, a user interface with a plurality of user interface elements for generating a virtual object corresponding to the detected real-world object;
receiving, via the one or more input devices, a first input including a selection of a first portion of the real-world object; and
updating an appearance of a first user interface element of the plurality of user interface elements in the user interface in accordance with the selection of the first portion of the real-world object to include a first characteristic corresponding to the first portion of the real-world object, wherein the first user interface element corresponds to creating content corresponding to a structure of the first portion of the real-world object.

10. The electronic device of claim 9, wherein the method further comprises:
receiving, via the one or more input devices, a second input including a selection of the first user interface element and including movement; and
generating the virtual object having the first characteristic corresponding to the structure of the first portion of the real-world object in accordance with the first user interface element and the movement.

11. The electronic device of claim 9, wherein updating the appearance of the first user interface element of the plurality of user interface elements in the user interface comprises updating from a first visual appearance to a second visual appearance different from the first visual appearance.

12. The electronic device of claim 11, wherein the first visual appearance comprises a wireframe drawing of the structure of the real-world object, and the second visual appearance comprises a wireframe drawing of the structure of the first portion of the real-world object.

13. The electronic device of claim 9, wherein the method further comprises updating an appearance of a second user interface element of the plurality of user interface elements in the user interface in accordance with the selection of the first portion of the real-world object to include a second characteristic corresponding to the first portion of the real-world object.

14. The electronic device of claim 9, wherein the method further comprises:

receiving, via the one or more input devices, a second input including a selection of a second portion of the real-world object; and updating the appearance of the first user interface element of the plurality of user interface elements in the user interface in accordance with the selection of the second portion of the real-world object to include a characteristic corresponding to the second portion of the real-world object.

15. A non-transitory computer readable storage medium storing one or more programs, the one or more programs comprising instructions, which when executed by one or more processors of an electronic device that is in communication with a display and one or more input devices, cause the electronic device to perform a method comprising:

detecting a real-world object;

presenting, via the display, a user interface with a plurality of user interface elements for generating a virtual object corresponding to the detected real-world object;

receiving, via the one or more input devices, a first input including a selection of a first portion of the real-world object; and updating an appearance of a first user interface element of the plurality of user interface elements in the user interface in accordance with the selection of the first portion of the real-world object to include a first characteristic corresponding to the first portion of the real-world object, wherein the first characteristic includes a sampled material of the first portion of the real-world object and updating the appearance of the first user interface element includes displaying, via the display, a first visual representation of the sampled material of the first portion of the real-world object.

16. The non-transitory computer readable storage medium of claim 15, wherein the method further comprises:

receiving, via the one or more input devices, a second input including a selection of the first user interface element and including movement; and generating the virtual object having the first characteristic corresponding to the real-world object in accordance with the first user interface element and the movement.

17. The non-transitory computer readable storage medium of claim 15, wherein the first user interface element corresponds to creating content corresponding to a material of the first portion of the real-world object.

18. The non-transitory computer readable storage medium of claim 15, wherein the method further comprises:

receiving, via the one or more input devices, a second input including a selection of a second portion of the real-world object; and updating the appearance of the first user interface element of the plurality of user interface elements in the user interface in accordance with the selection of the second portion of the real-world object to include a characteristic corresponding to the second portion of the real-world object.

19. The non-transitory computer readable storage medium of claim 15, wherein the method further comprises updating an appearance of a second user interface element of the plurality of user interface elements in the user interface in accordance with the selection of the first portion of the real-world object to include a second characteristic, different from the first characteristic, corresponding to the first portion of the real-world object.

20. The non-transitory computer readable storage medium of claim 19, wherein the second user interface element corresponds to creating content corresponding to a structure of the first portion of the real-world object.

* * * * *